US010496832B2

(12) United States Patent
Brudnicki et al.

(10) Patent No.: US 10,496,832 B2
(45) Date of Patent: *Dec. 3, 2019

(54) SYSTEM AND METHOD FOR INITIALLY ESTABLISHING AND PERIODICALLY CONFIRMING TRUST IN A SOFTWARE APPLICATION

(71) Applicant: Sequent Software, Inc., Santa Clara, CA (US)

(72) Inventors: David Brudnicki, Duvall, WA (US); Kaushik Roy, Foster City, CA (US); Patrick Lim, Cupertino, CA (US)

(73) Assignee: GFA Worldwide, Inc., Foster City, CA (US)

( * ) Notice: Subject to any disclaimer, the term of this patent is extended or adjusted under 35 U.S.C. 154(b) by 228 days.

This patent is subject to a terminal disclaimer.

(21) Appl. No.: 15/785,076

(22) Filed: Oct. 16, 2017

(65) Prior Publication Data

US 2018/0053170 A1  Feb. 22, 2018

Related U.S. Application Data

(63) Continuation of application No. 15/132,000, filed on Apr. 18, 2016, now Pat. No. 9,792,598, which is a
(Continued)

(51) Int. Cl.
*H04L 29/06* (2006.01)
*G06F 12/14* (2006.01)
(Continued)

(52) U.S. Cl.
CPC ............ *G06F 21/604* (2013.01); *G06F 12/14* (2013.01); *G06F 21/31* (2013.01);
(Continued)

(58) Field of Classification Search
None
See application file for complete search history.

(56) References Cited

U.S. PATENT DOCUMENTS

2007/0011724 A1   1/2007  Gonzalez et al.
2007/0192841 A1*  8/2007  Kim ...................... H04L 9/0866
                                                                726/5
(Continued)

FOREIGN PATENT DOCUMENTS

EP       2787476       10/2014
JP    2004-287593 A    10/2004
(Continued)

OTHER PUBLICATIONS

Notification for Reasons of Refusal regarding Japanese Patent App. No. 2016-519618, dated Apr. 3, 2018.
(Continued)

*Primary Examiner* — Shin-Hon (Eric) Chen
(74) *Attorney, Agent, or Firm* — Dunlap Codding, P.C.

(57) ABSTRACT

Systems and methods for providing trust provisioning are disclosed. A utilization request requesting to utilize data stored by a secure element associated with the device may be processed by a software application. In response to processing the utilization request, a registration request message for registering the software application may be communicated to a management server. A validation code may be received from the management server in reply to the registration request message. The received validation code may be verified to match a second validation code. Subsequent to successful verification, a passcode and an identifier of the secure element may be communicated to the management server. In response to communicating the passcode and the secure element identifier, an acknowledgement may
(Continued)

be received from the management server specifying whether registration of the software application was successful.

18 Claims, 16 Drawing Sheets

Related U.S. Application Data continuation of application No. 13/916,307, filed on Jun. 12, 2013, now Pat. No. 9,317,704.

(51) Int. Cl.

| | | |
|---|---|---|
| G06F 21/60 | (2013.01) | |
| G06Q 20/32 | (2012.01) | |
| H04W 12/08 | (2009.01) | |
| G06Q 20/36 | (2012.01) | |
| G06F 21/31 | (2013.01) | |
| G06F 21/62 | (2013.01) | |
| G06Q 20/20 | (2012.01) | |
| H04W 12/06 | (2009.01) | |
| H04W 12/00 | (2009.01) | |
| G06F 11/00 | (2006.01) | |
| G06F 12/16 | (2006.01) | |
| G08B 23/00 | (2006.01) | |
| H04W 4/24 | (2018.01) | |

(52) U.S. Cl.
CPC ....... *G06F 21/6218* (2013.01); *G06Q 20/206* (2013.01); *G06Q 20/3226* (2013.01); *G06Q 20/3227* (2013.01); *G06Q 20/367* (2013.01); *H04L 63/00* (2013.01); *H04L 63/083* (2013.01); *H04L 63/102* (2013.01); *H04W 12/0023* (2019.01); *H04W 12/06* (2013.01); *H04W 12/08* (2013.01); *H04W 4/24* (2013.01)

(56) References Cited

U.S. PATENT DOCUMENTS

| | | | | |
|---|---|---|---|---|
| 2010/0041368 A1* | 2/2010 | Kumar | .................. | G06Q 20/02 455/407 |
| 2010/0043062 A1* | 2/2010 | Alexander | .............. | G06F 21/36 726/6 |
| 2011/0010547 A1* | 1/2011 | Noda | .................... | G06F 21/445 713/168 |
| 2011/0265159 A1* | 10/2011 | Ronda | ................ | H04L 63/0853 726/6 |
| 2012/0095852 A1* | 4/2012 | Bauer | .................. | G06O 20/105 705/16 |
| 2012/0124394 A1 | 5/2012 | Brudnicki et al. | | |
| 2012/0124658 A1* | 5/2012 | Brudnicki | ............... | G06F 21/34 726/9 |
| 2012/0124659 A1 | 5/2012 | Craft et al. | | |
| 2012/0266220 A1 | 10/2012 | Brudnicki et al. | | |
| 2012/0284195 A1* | 11/2012 | McMillen | .......... | G06Q 20/3223 705/71 |
| 2013/0171929 A1* | 7/2013 | Adams | .................... | H04W 4/80 455/41.1 |
| 2013/0226792 A1* | 8/2013 | Kushevsky | .......... | G06Q 20/322 705/41 |
| 2013/0339166 A1* | 12/2013 | Baer | .................... | G06Q 20/227 705/16 |
| 2014/0058937 A1* | 2/2014 | Watson | ................ | G06Q 20/204 705/41 |
| 2015/0101059 A1* | 4/2015 | Galpin | .................... | G06F 21/12 726/26 |

FOREIGN PATENT DOCUMENTS

| | | |
|---|---|---|
| JP | WO2004-066159 | 5/2006 |
| JP | 2007-206893 A | 8/2007 |
| JP | 2008-205816 A | 9/2008 |
| JP | 2008-250911 A | 10/2008 |
| JP | 2010-079795 A | 4/2010 |
| KR | 1020130061648 | 6/2012 |

OTHER PUBLICATIONS

Globalplatform, Advancing Standards for Smart Card Growth, "GlobalPlatform Card Specification Version 2.1", Jun. 4, 2001, pp. 1-222, Copyright 2001 GlobalPlatform Inc.
Globalplatform, Advancing Standards for Smart Card Growth, "GlobalPlatform Card Specification Version 2.1.1", Mar. 25, 2003, pp. 1-237, Copyright 2003 GlobalPlatform Inc.
Globalplatform, Advancing Standards for Smart Card Growth, "GlobalPlatform Card Specification Version 2.1.1 Amendment A", Mar. 2004, pp. 1-10, Copyright 2004 GlobalPlatform Inc.
Globalplatform, The Standard for Smart Card Infrastructure, "GlobalPlatform Card Specification Version 2.2", Mar. 2006, pp. 1-375, Copyright 2006 GlobalPlatform Inc.
Globalplatform, The Standard for Managing Applications on Secure Chip Technology, "GlobalPlatform Card Specification, Version 2.2.1 Public Release", Jan. 2011, pp. 1-303, Copyright 2006-2011 GlobalPlatform Inc.
Globalplatform, The Standard for Managing Applications on Secure Chip Technology, "GlobalPlatform Card Confidential Card Content Management Card Specification v2.2—Amendment A, Version 1.0.1 Public Release", Jan. 2011, pp. 1-26, Copyright 2007-2011 GlobalPlatform Inc.
D. Hardt, Ed., RFC 6749—"The OAuth 2.0 Authorization Framework", Mar. 23, 2013, pp. 1-152.
International Search Report (PCT/US2014/041962); dated Oct. 22, 2014.
European Search Report (EP 1417213.4); dated Nov. 19, 2014.

\* cited by examiner

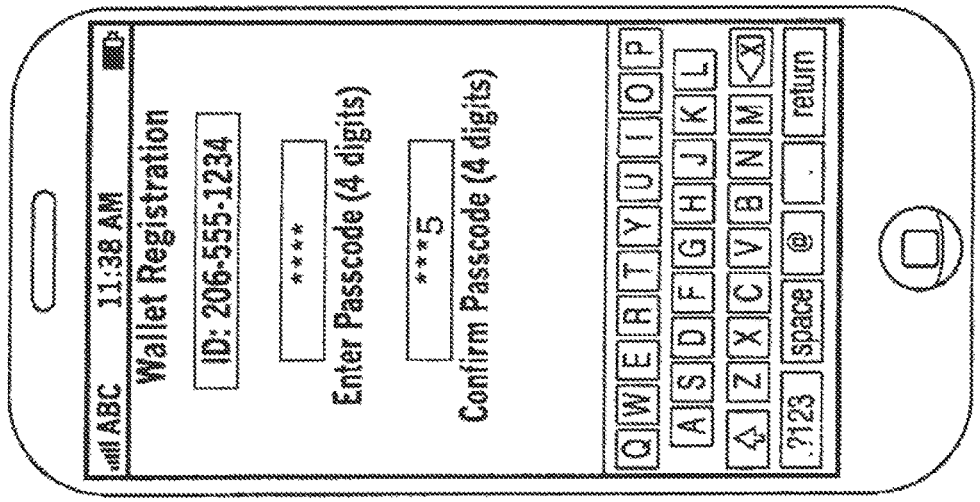
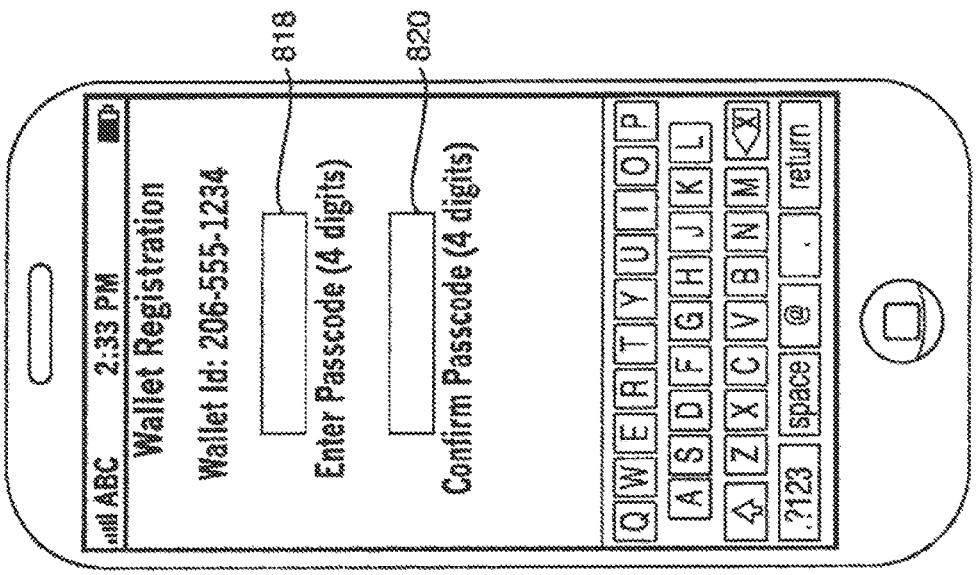
Figure 8E
Figure 8F

SYSTEM AND METHOD FOR INITIALLY ESTABLISHING AND PERIODICALLY CONFIRMING TRUST IN A SOFTWARE APPLICATION

INCORPORATION BY REFERENCE

The present patent application is a continuation of a patent application identified by U.S. Ser. No. 15/132,000, filed on Mar. 18, 2016 which will issue as U.S. Pat. No. 9,792,598, which is a continuation of a patent application identified by U.S. Ser. No. 13/916,307, filed on Jun. 12, 2013 which issued as U.S. Pat. No. 9,317,704, the disclosures of which are hereby incorporated by reference in their entirety.

TECHNICAL FIELD

The present invention relates generally to provisioning a portable communication device toward ensuring secure operation of a software application on that portable communication device, and more particularly to a system and method for initially establishing and periodically confirming trust in the software application.

BACKGROUND

Wireless transactions using RFID-based proximity cards are fairly commonplace. For instance, many workers use RFID keycards to gain access to their workplace, and drivers use RFID passes to pay tolls at highway speeds. RFID, which stands for radio-frequency identification, uses electromagnetic waves to exchange data between a terminal and some object for the purpose of identification. More recently, companies have been trying to use RFIDs supported by cellular telephones to implement an electronic payment product (i.e., credit and/or debit card). However, basic RFID technology raises a number of security concerns that have prompted modifications of the basic technology. Still, widespread adoption of RFID as a mechanism for electronic payments has been slow.

Near Field Communication (NFC) is another technology that uses electromagnetic waves to exchange data. NFC waves are only transmitted over a short-range (on the order of a few inches) and at high-frequencies. NFC devices are already being used to make payments at point of sale devices. NFC is an open standard (see, e.g., ISO/IEC 18092) specifying modulation schemes, coding, transfer speeds, and RF interface. There has been wider adoption of NFC as a communication platform because it provides better security for financial transactions and access control. Other short distance communication protocols are known and may gain acceptance for use in supporting financial transactions and access control.

Many applications have been developed for use in association with portable communications devices. Some of these applications would benefit from having access to electronic funds to facilitate the consumer's consummation of electronic transactions via those applications, such as the purchase of goods over the Internet. Still other applications, such as electronic wallets, would have no purpose if they could not access the secure data subsystem of the portable communication device.

Card issuers are interested in facilitating the option to pay for application usage and ecommerce using their credit/debit card products. Notwithstanding their self-interest in enabling third party applications to access their financial products, the card issuers may have serious security concerns about broad distribution of security protocols. Similarly, the third party developers may not be interested in developing financial product subroutines. Accordingly, there is a need in the industry for an electronic wallet that is accessible by third party programs to facilitate the payment of charges associated with the use of those programs. The application accessible electronic wallet may also be used via direct access by the consumer to the mobile application.

Accordingly, the present invention seeks to provide one or more solutions to the foregoing problems and related problems as would be understood by those of ordinary skill in the art having the present specification before them. These and other objects and advantages of the present disclosure will be apparent to those of ordinary skill in the art having the present drawings, specifications, and claims before them. It is intended that all such additional systems, methods, features, and advantages be included within this description, be within the scope of the disclosure, and be protected by the accompanying claims.

SUMMARY

The following presents a simplified summary of the present disclosure in order to provide a basic understanding of some aspects of the disclosure. This summary is not an extensive overview of the disclosure. It is not intended to identify key or critical elements of the disclosure or to delineate the scope of the disclosure. The following summary merely presents some concepts of the disclosure in a simplified form as a prelude to the more detailed description provided below.

Methods, systems, apparatuses, and computer readable media are disclosed for trust provisioning a portable communication device toward ensuring secure interoperation between software and a secure element associated with the portable communication device. In an example, a utilization request requesting to utilize data stored by a secure element associated with the device may be processed by a software application. In response to processing the utilization request, a registration request message for registering the software application may be communicated to a management server. A validation code may be received from the management server in reply to the registration request message. The received validation code may be verified to match a second validation code. Subsequent to successful verification, a passcode and an identifier of the secure element may be communicated to the management server. In response to communicating the passcode and the secure element identifier, an acknowledgement may be received from the management server specifying whether registration of the first software application was successful.

BRIEF DESCRIPTION OF THE DRAWINGS

For a better understanding of the present disclosure, non-limiting and non-exhaustive embodiments are described in reference to the following drawings. In the drawings, like reference numerals refer to like parts through all the various figures unless otherwise specified.

FIGS. 8A-I illustrate graphical user interfaces presented by a portable communication device in accordance with example embodiments.

DETAILED DESCRIPTION

Figure 1A:
FIG. 1a illustrates the diagnostic agent installed in the end user's portable communication device asking whether she would like diagnostics performed following a failed attempt to use her device to conduct a secure payment transaction at a point of sale.

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Portable Communication Device

The present invention provides a system and method that can be utilized with a variety of different portable communication devices, including but not limited to PDA's, cellular phones, smart phones, laptops, tablet computers, and other mobile devices that include cellular voice and data service as well as preferable access to consumer downloadable applications. One such portable communication device could be an iPhone, Motorola RAZR or DROID; however, the present invention is preferably platform and device independent. For example, the portable communication device technology platform may be Microsoft Windows Mobile, Microsoft Windows Phone 7, Palm OS, RIM Blackberry OS, Apple OS, Android OS, Symbian, Java or any other technology platform. For purposes of this disclosure, the present invention has been generally described in accordance with features and interfaces that are optimized for a smart phone utilizing a generalized platform, although one skilled in the art would understand that all such features and interfaces may also be used and adapted for any other platform and/or device.

The portable communication device includes one or more short proximity electromagnetic communication devices, such as an NFC, RFID, or Bluetooth transceiver. It is presently preferred to use an NFC baseband that is Compliant with NFC IP 1 standards (www.nfcforum.org), which provides standard functions like peer-to-peer data exchange, reader-writer mode (i.e., harvesting of information from RFID tags), and contactless card emulation (per the NFC IP 1 and ISO 14443 standards) when paired with a secure element on the portable communication device and presented in front of a "contactless payment reader" (see below at point of sale). As would be understood in the art by those having the present specification, figures, and claims before them, the NFC IP 1 standards are simply the presently preferred example, which could be exported—in whole or in part—for use in association with any other proximity communication standard. It is further preferred that the portable communication device include an NFC/RFID antenna (conformed to NFC IP 1 and ISO 14443 standards) to enable near field communications. However, as would be understood in the art NFC/RFID communications may be accomplished albeit over even shorter ranges and potential read problems.

The portable communication device also includes a mobile network interface to establish and manage wireless communications with a mobile network operator. The mobile network interface uses one or more communication protocols and technologies including, but not limited to, global system for mobile communication (OSM), 30, 40, code division multiple access (CDMA), time division multiple access (TDMA), user datagram protocol (UDP), transmission control protocol/Internet protocol (TCP/IP), SMS, general packet radio service (GPRS), WAP, ultra-wide band (UWB), TFEE 802.16 Worldwide Interoperability for Microwave Access (WiMax), SIP/RTP, or any of a variety of other wireless communication protocols to communicate with the mobile network of a mobile network operator. Accordingly, the mobile network interface may include a transceiver, transceiving device, or network interface card (NIC). It is contemplated that the mobile network interface and short proximity electromagnetic communication device could share a transceiver or transceiving device, as would be understood in the art by those having the present specification, figures, and claims before them.

The portable communication device further includes a user interface that provides some means for the consumer to receive information as well as to input information or otherwise respond to the received information. As is presently understood (without intending to limit the present disclosure thereto) this user interface may include a microphone, an audio speaker, a haptic interface, a graphical display, and a keypad, keyboard, pointing device and/or touch screen. As would be understood in the art by those having the present specification, figures, and claims before them, the portable communication device may further include a location transceiver that can determine its physical coordinates relative to the surface of the Earth, typically as a function of the device's latitude, longitude and altitude. This location transceiver preferably uses OPS technology, so it may be referred to herein as a OPS transceiver; however, it should be understood that the location transceiver can additionally (or alternatively) employ other geo-positioning mechanisms, including, but not limited to, triangulation, assisted GPS (AGPS), E-OTD, CI, SAI, ETA, BSS or the like, to determine the physical location of the portable communication device relative to the surface of the Earth.

The portable communication device will also include a microprocessor and mass memory. The mass memory may include ROM, RAM as well as one or more removable memory cards. The mass memory provides storage for computer readable instructions and other data, including a basic input/output system ("BIOS") and an operating system for controlling the operation of the portable communication device. The portable communication device will also include a device identification memory to identify the device, which may comprise dedicated memory such as a SIM card. As is generally understood, SIM cards contain the unique serial number of the device (ESN), an internationally unique number of the mobile user (IMSI), security authentication and ciphering information, temporary information related to the local network, a list of the services the user has access to and two passwords (PIN for usual use and PUK for unlocking). As would be understood in the art by those having the present specification, figures, and claims before them, other information may be maintained in the device identification memory depending upon the type of device, its primary network type, home mobile network operator, etc.

In the present invention each portable communication device is thought to have two subsystems: (1) a "wireless subsystem" that enables communication and other data applications as has become commonplace with users of cellular telephones today, and (2) the "secure transactional subsystem" which may also be known as the "payment subsystem". It is contemplated that this secure transactional subsystem will preferably include a Secure Element, similar (if not identical) to that described as part of the Global Platform 2.1.X, 2.2, or 2.2.X (www.globalplatfmm.org). The secure element has been implemented as a specialized, separate physical memory used for industry common practice of storing payment card track data used with industry common point of sale; additionally, other secure credentials that can be stored in the secure element include employment badge credentials (enterprise access controls), hotel and other card-based access systems and transit credentials.

Mobile Network Operator

Each of the portable communications devices is connected to at least one mobile network operator. The mobile network operator generally provides physical infrastructure that supports the wireless communication services, data applications and the secure transactional subsystem via a plurality of cell towers that communicate with a plurality of portable communication devices within each cell tower's associated cell. In turn, the cell towers may be in operable communication with the logical network of the mobile network operator, POTS, and the Internet to convey the communications and data within the mobile network operator's own logical network as well as to external networks including those of other mobile network operators. The mobile network operators generally provide support for one or more communication protocols and technologies including, but not limited to, global system for mobile communication (GSM), 3G, 4G, code division multiple access (CDMA), time division multiple access (TDMA), user datagram protocol (UDP), transmission control protocol/Internet protocol (TCPIIP), SMS, general packet radio service (GPRS), WAP, ultra-wide band (UWB), IEEE 802.16 Worldwide Interoperability for Microwave Access (WiMax), SIP/RTP, or any of a variety of other wireless communication protocols to communicate with the portable communication devices.

Retail Subsystem

Standard at merchants today is an Internet Protocol connected payment system that allows for transaction processing of debit, credit, prepay and gift products of banks and merchant service providers. By swiping a magnetic stripe enabled card at the magnetic reader of a Point of Sale Terminal, the card data is transferred to the point of sale equipment and used to confirm funds by the issuing bank. This point of sale equipment has begun to include contactless card readers as accessories that allow for the payment card data to be presented over an RF interface, in lieu of the magnetic reader. The data is transferred to the reader through the RF interface by the ISO 14443 standard and proprietary payment applications like PayPass and Paywave, which transmit the contactless card data from a card and in the future a mobile device that includes a Payment Subsystem.

A retailer's point of sale device 75 may be connected to a network via a wireless or wired connection. This point of sale network may include the Internet in addition to Local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, the point of sale network may utilize any communication method that allows information to travel between the point of sale devices and financial services providers for the purpose of validating, authorizing and ultimately capturing financial transactions at the point of sale for payment via the same financial service providers.

Secure Transactional Subsystem

The system includes a secure transactional subsystem. The secure transactional subsystem includes the secure element and associated device software for communication to management and provisioning systems as well as the customer facing interface for use and management of secure data stored in the secure element. Preferably the secure transactional subsystem will conform, where appropriate, to an international standard, such as the standard defined in Global Platform 2.1.X or 2.2.

System Management Back End

Figure 1B:
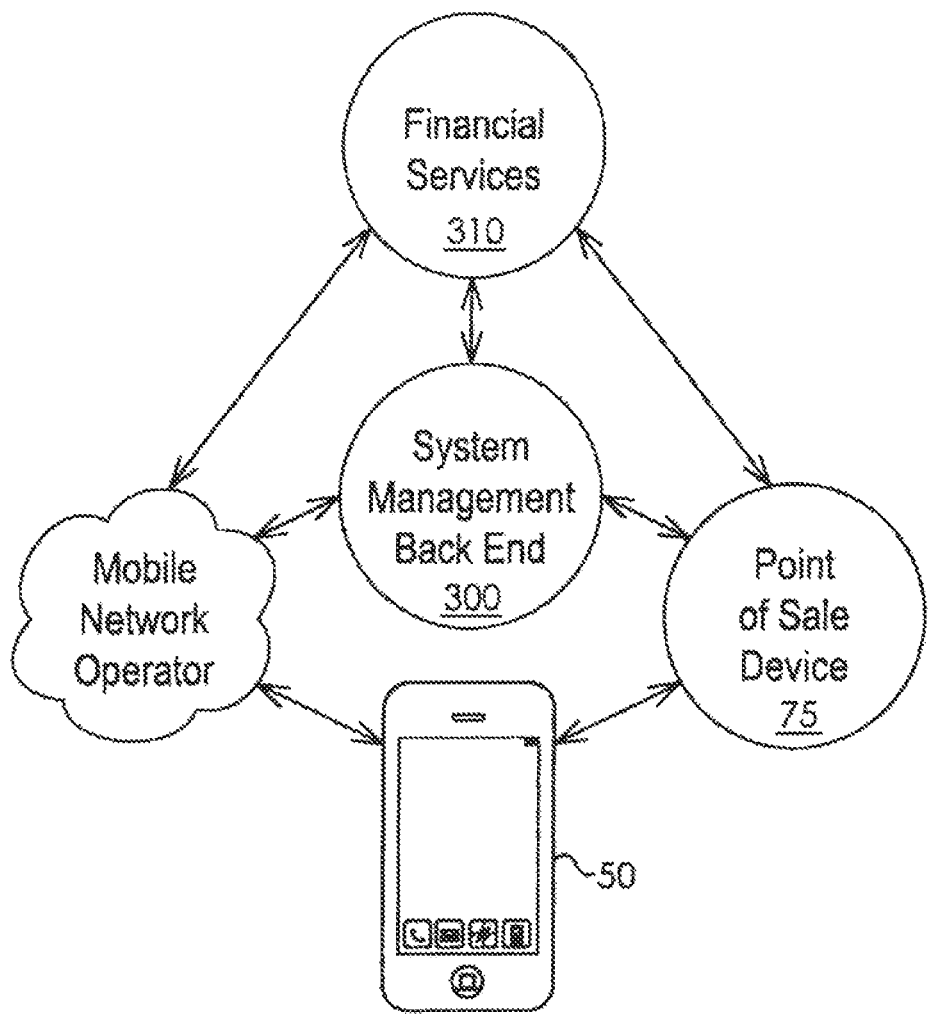
FIG. 1b illustrates the operable interconnections between the end user's smartphone and various subsystems, including the system management back end.

The system includes a system management back end. As shown in FIG. 1b, the system management back end 300 is connected to the retail subsystem, the secure transactional subsystem and to a plurality of portable communication devices via the infrastructure of at least one mobile network operator. The system management back end has a server operably communicating with one or more client devices. The server is also in operable communication with the retailer subsystem, secure transactional subsystem, and one or more portable communication devices. The server is also in operable communication with the retailer subsystem, secure transactional subsystem, and one or more portable communication devices. The communications include data and voice channels. Any type of voice channel may be used in association with the present invention, including but not limited to VoIP.

The server may comprise one or more general-purpose computers that implement the procedures and functions needed to run the system back office in serial or in parallel on the same computer or across a local or wide area network distributed on a plurality of computers and may even be located "in the cloud" (preferably subject to the provision of sufficient security). The computer(s) comprising the server may be controlled by Linux, Windows®, Windows CE, Unix, or a Java® based operating system, to name a few. The system management back end server is operably associated with mass memory that stores program code and data. Data may include one or more databases, text, spreadsheet, folder, file, or the like, that may be configured to maintain and store a knowledge base, user identifiers (ESN, IMSI, PIN, telephone number, email/IM address, billing information, or the like).

The system management back end server supports a case management system to provide call traffic connectivity and distribution across the client computers in the customer care center. In a preferred approach using VoIP voice channel connectivity, the case management system is a contact/case management system distributed by Oracle Corp. of Redwood Shores, Calif. Other contact/case management systems may be used, such as those available by Contactual, Inc. of Redwood City, Calif. The Oracle case management system is a standard CRM system for a VoIP-based customer care call center that also provides flexibility to handle care issues with simultaneous payments and cellular-related care concerns. As would be understood by one of ordinary skill in the art having the present specification, drawings and claims before them other case management systems may be utilized within the present invention such as Salesforce (Salesforce.com, Inc. of San Francisco, Calif.) and Novo (Novo Solutions, Inc. of Virginia Beach, Va.).

Each client computer associated with the system management back end server preferably has a network interface device, graphical user interface, and voice communication capabilities that match the voice channel(s) supported by the client care center server, such as VoIP. Each client computer can request status of both the cellular and secure transactional subsystems of a portable communication device. This status may include the contents of the soft memory and core performance of portable communication device, the NFC components: baseband, NFC antenna, secure element status and identification.

Federated Payment Subsystem

Figure 2:
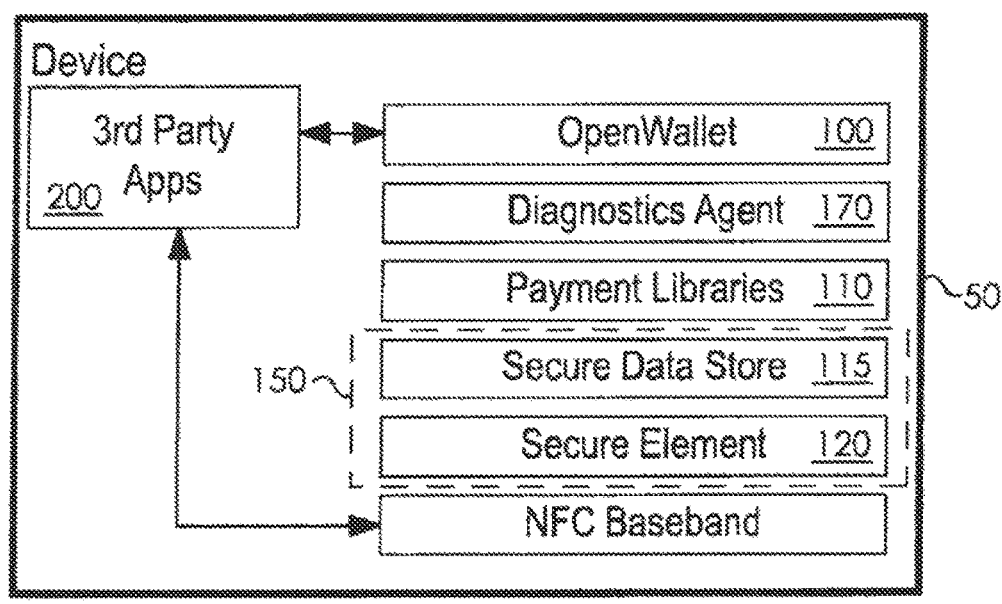
FIG. 2 is a block diagram illustrating some of the logical blocks within a portable communication device that may be relevant to the present system.

As shown in FIG. 2, each portable communication device 50 may contain one or more third party applications 200 (e.g., selected by the consumer), an "open architecture" electronic wallet 100 (referred to below as an "OpenWallet"), payment libraries 110, secure element 120, NFC Baseband, a payment subsystem 150 (i.e., secure data store 115 and secure element 120), and diagnostic agent 170. OpenWallet 100 can be thought of as a computer application that allows the consumer to see all credentials (e.g., card, coupon, access control and ticket data) stored in the device 50 (preferably in payment subsystem 150). OpenWallet 100 would also preferably track the issuers of all the credentials stored in the portable communication device's payment subsystem 150 and determine on an application-by-application basis whether that third party application should have permissions to view, select and/or change the credentials stored in the payment subsystem. In this manner, OpenWallet 100 also prevents unauthorized applications from accessing data stored in the payment subsystem 150, which they do not currently have permission to access.

The payment libraries 110 are preferably used by OpenWallet 100 to manage (and perform housekeeping tasks on) the secure element 120, interface with the system management back end, and perform over-the-air (OTA) provisioning via data communication transceiver (including its SMS channel), on the device 50. It is contemplated that the OTA data communications will be encrypted in some manner and an encryption key will be deployed in card services module 420. The payment subsystem 150 may be used to store credentials such as payment card, coupon, access control and ticket data (e.g., transportation, concert). Some of these payment types may be added to the payment subsystem by different applications 200 for use by those applications. In this manner, other third party applications (not shown) may be precluded from accessing the payment subsystem 150.

The secure data store 115 provides secured storage on the portable communication device 50. Various levels of security may be provided depending upon the nature of the data intended for storage in secure data store 115. For instance) secure data store 115 may simply be password-protected at the operating system level of device 50. As is known in these operating systems, the password may be a simple alphanumeric or hexadecimal code that is stored somewhere on the device 50. Alternatively, the data in secure data store 115 is preferably encrypted. More likely, however, the secure data store 115 will be set up as a virtual secure element in the manner disclosed in the co-pending U.S. patent application (owned by the assignee of the present application) Ser. No. 13/279,147, entitled "System and Method for Providing A Virtual Secure Element on a Portable Communication Device" filed Oct. 21, 2011, and hereby incorporated by reference in its entirety.

OpenWallet 100 preferably removes the complexity involved in the storage, maintenance and use of credentials such as card, coupon, ticket, access control data from one or multiple sources or issuers in association with the payment subsystem 150. OpenWallet 100 also preferably enforces access control to the data stored in the payment subsystem 150 and the functions allowed by each application. In one approach, OpenWallet 100 verifies the author/issuer of each third party application stored on the portable communication device 50. This verification may be accomplished by accessing a local authorization database of permitted (i.e.) trusted) applications (see FIG. 6). Under this approach) only applications that are signed with a known Issuer ID and the correctly associated Compile ID are allowed by card services module 420 to access and/or manipulate data stored in the payment subsystem 150 and/or meta data repository 125 (which stores, among other things, card image data and any embossed card data).

In other words, when an application 200 or wallet user interface 410 needs to interact with the payment subsystem 150 it does so by passing a digital identifier (such as its Issuer ID or App ID), a digital token (i.e., Compile ID or Secret Token ID), the desired action, and any associated arguments needed for the action to the card services module 420. Card services module 420 verifies the digital identifier-digital token pair matches trusted application data in the secure data table (FIG. 6), and then would issue the one or more commands necessary to execute the desired action. Among the potential actions that may be used by applications 200 or wallet user interface 410 are those associated with:

a. wallet management (e.g., setting, resetting or enabling wallet passcodes; get URL of OTA server; over-the-air registry provisioning; setting payment timing; increasing payment timing; set default card; list issuers, list supported credentials; set display sequence of credentials; set credential storage priority; create categories/folders; associate credentials with categories; memory audit; determine Secure Element (SE) for storage of credential; get Offers; update wallet status);

b. credential management (e.g., add credential; view credential detail; delete credential; activate credential (for redemption/payment); deactivate credential; search credentials; list credential capability; set default credential; lock/unlock credential; require passcode access; get credential image; set access passcode);

c. Secure Element (SE) Management (e.g., create security domains for issuers; rotate keys; load applications; update applications; wallet lock/unlock; SE lock/unlock);

d. Personalization (e.g., add credential; delete credential; suspend/unsuspend credential; notification for issuer metadata update; notification for card metadata update).

Figure 4:
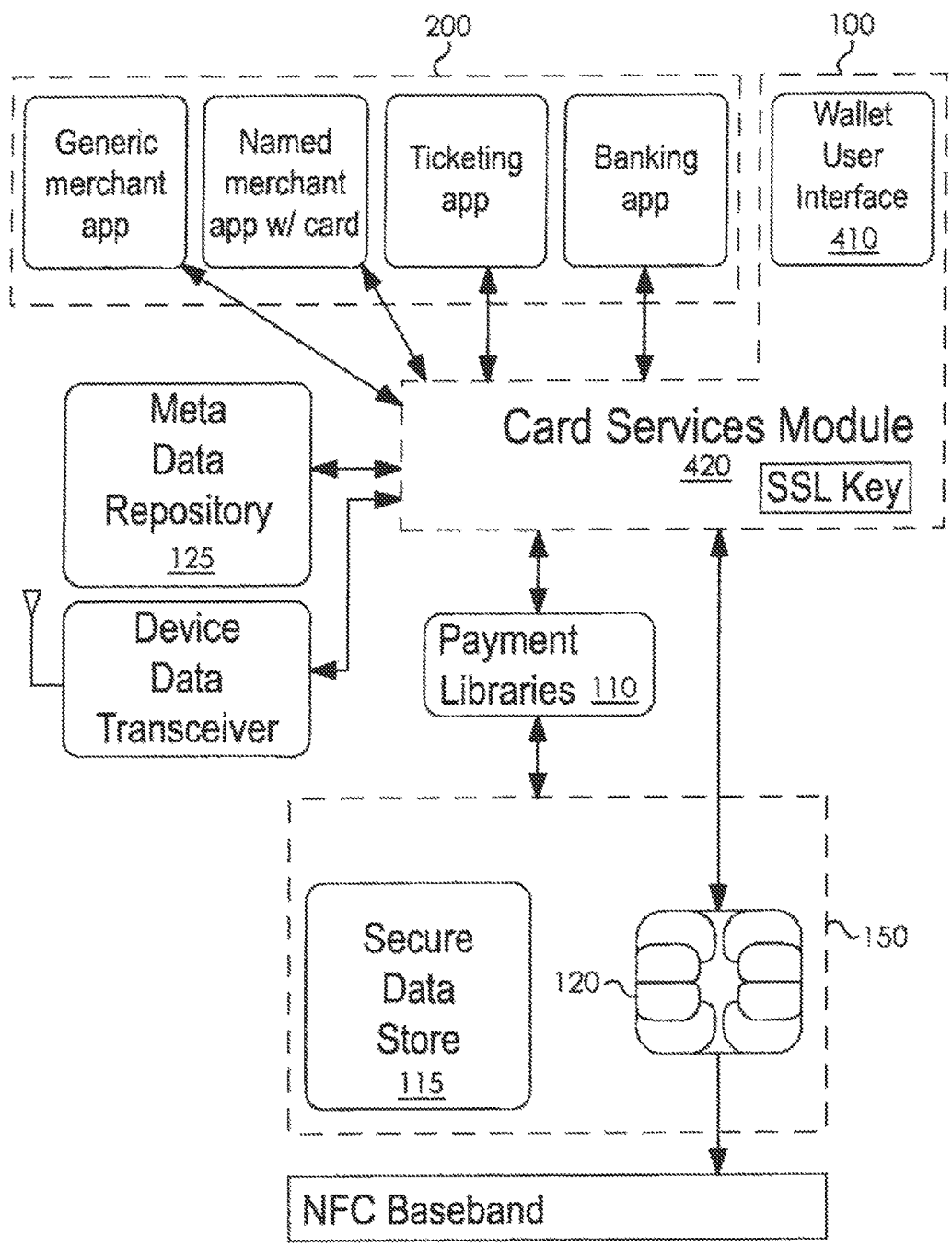
FIG. 4 is a block diagram illustrating further detail of the "OpenWallet" block of FIG. 2 that may be relevant to the present system.

FIG. 4 illustrates further detail of the "OpenWallet" block of FIG. 2. As shown, the functions of "OpenWallet" 100 can be integrated into a single dedicated module that provides a user interface that is closely coupled to the card services. In another embodiment illustrated in FIG. 4, the capabilities and functionality of OpenWallet 100 may be distributed between a Wallet User Interface 410 and a Card Services Module 420. The distributed approach would allow applications to have direct access to the Card Services Module 420 without having to use the user interface provided by Wallet User Interface 410. The Card Services Module 420 may be configured to track the issuer of all card, coupon, access and ticket data stored in the payment subsystem 150 of the portable communication device 50 and determine on an application-by-application basis whether an application should have permissions to view, select, use and/or change secure data stored in the payment subsystem. The wallet user interface 410 provides a user interface through which a user may register, provision, access and/or use the information securely stored in association with the card services module 420 relating to the user's credentials. Because the wallet user interface 410 is separated from the card services module 420, the user may elect to use one of the third party applications 200 to manage information in the Card Services Module 420. As further shown in FIG. 4, metadata (such as credential logos (e.g., Amtrak®, MasterCard®, TicketMaster®, and Visa®) and affinity images (e.g., AA Advantage® and United Mileage Plus®)) may be stored in memory 125 for use by the third party apps 200 or wallet user interface 410 in rendering a more friendly user experience. As this metadata can be shared across application, the storage needed to implement secured transaction may be minimized.

Figure 4C:
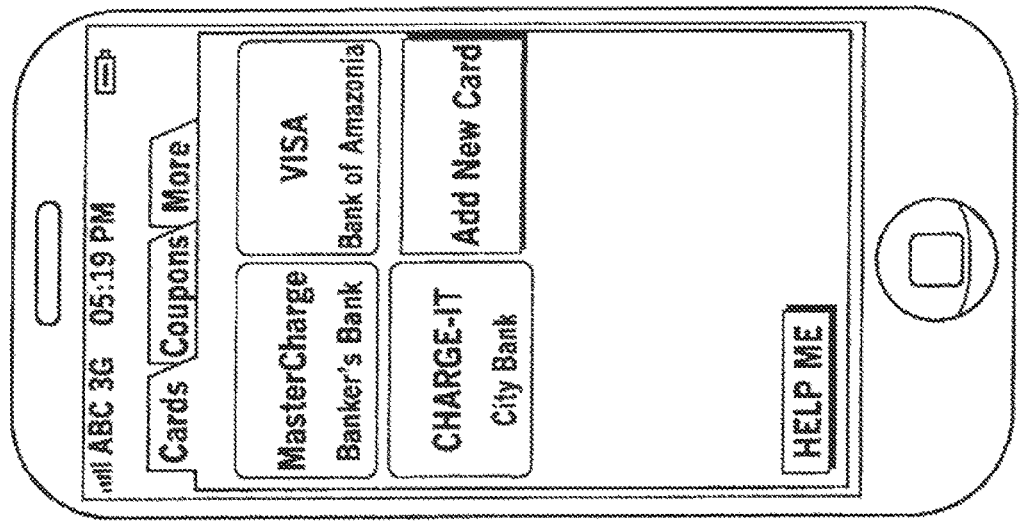
FIGS. 4A, 4B, 4C and 4D are illustrations of various screens from an exemplary wallet user interface that may be deployed on a smart phone.
Figure 4B:
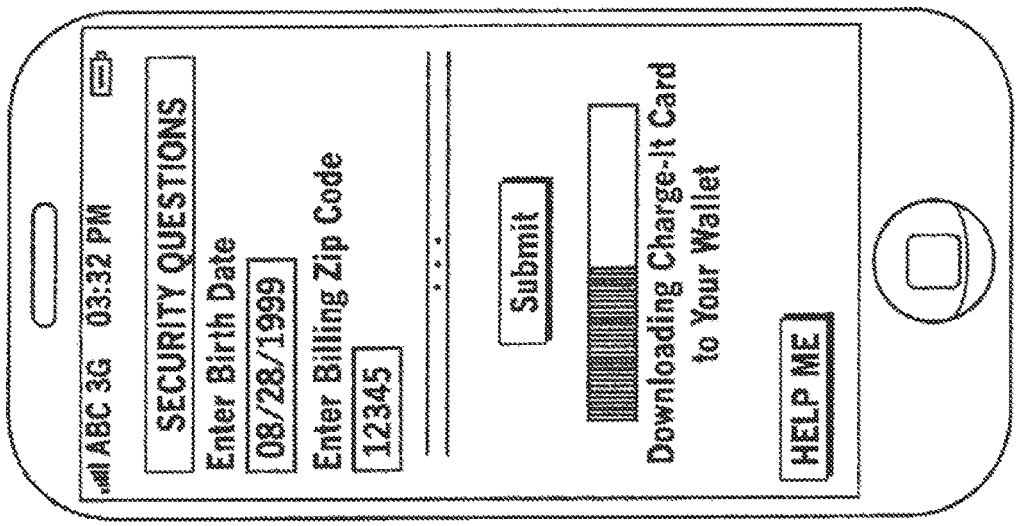
Figure 4A:
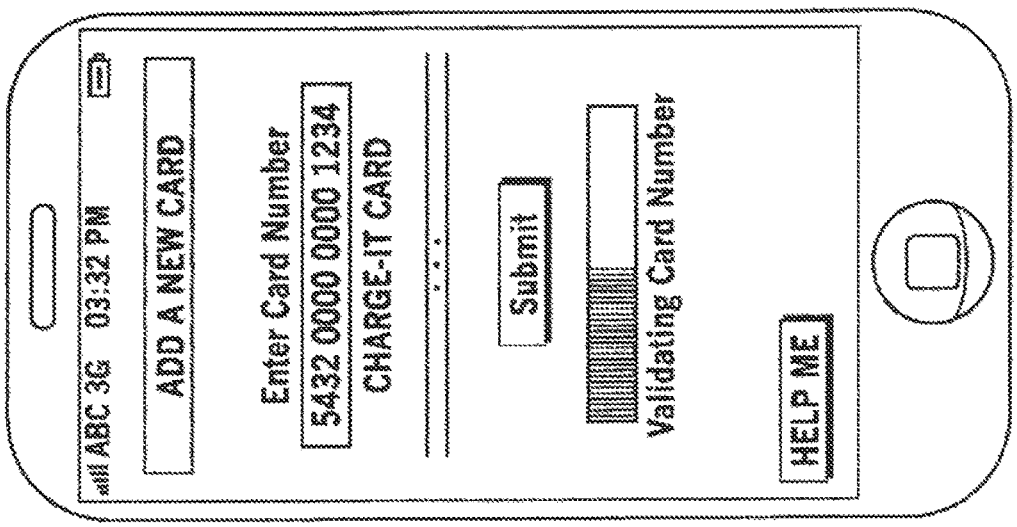
Figure 4D:
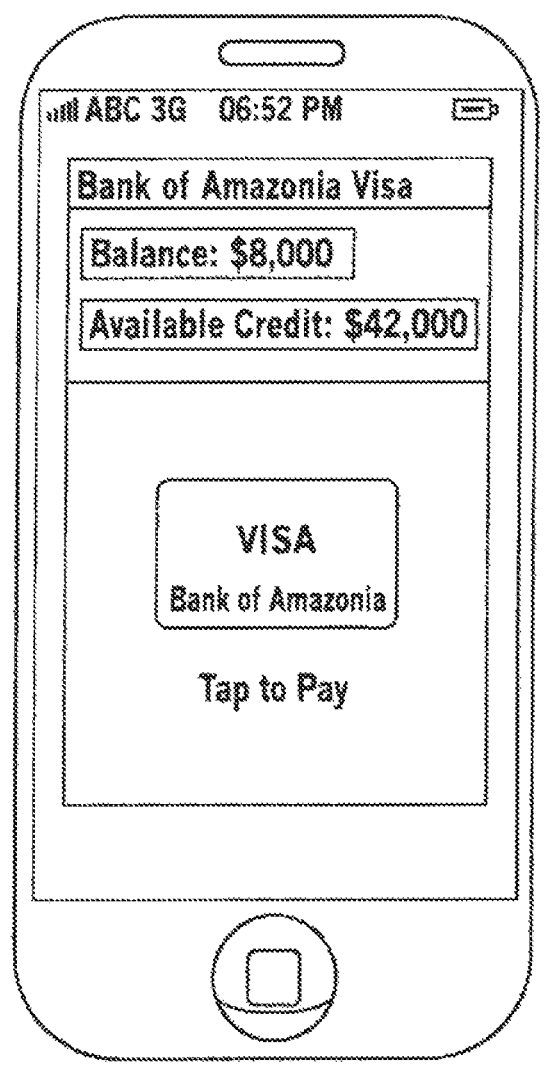

Various screen shots of one exemplary wallet user interface 410 that may be deployed on a smart phone are shown in FIGS. 4A, 4B, 4C and 4D. Among other things these figures illustrate the functionality of registering, provisioning, access and/or using information securely stored in association with the card services module 420. FIG. 4A depicts that the wallet can hold various credentials such as cards, coupons, tickets and more. FIG. 4A further depicts that multiple cards may be stored in the wallet 100. As shown in FIG. 4D, upon selecting the Visa® card from the screen illustrated in FIG. 4A, the wallet user interface opens another screen that provides an interface for the user to initiate a secure NFC payment transaction. As also depicted, the user interface may show balance and available credit information.

Credential Provisioning

Figure 5:
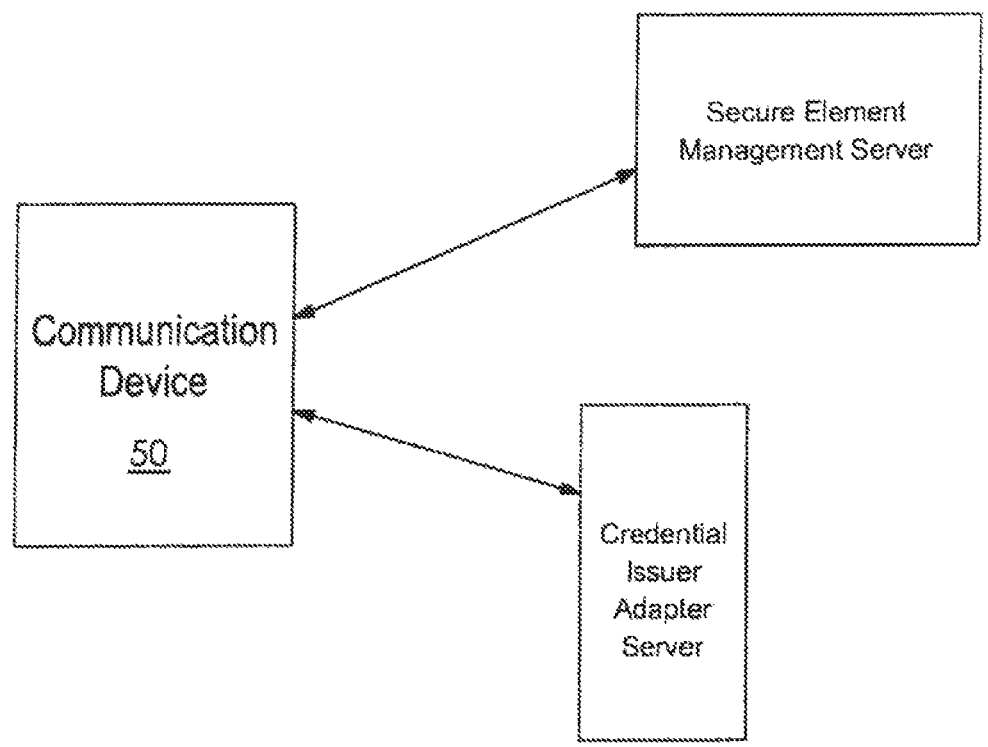
FIG. 5 is a block diagram illustrating the operable interconnections between the end user's smartphone, a Secure Element Management Server, and a Credential Issuer Adapter server.

FIG. 5 illustrates one exemplary system architecture that may be utilized to provision credentials in the system. As shown, the user's portable communication device 50 is configured to communicate with a secure element management server and a credential issuer adapter server. The secure element management server (which may alternatively be known as a Card Application Management System) is configured to validate a user's credentials. For example, if the user wishes to store information relating to a credit card in the secure element 120 of device 50, they would input their credit card information via a user interface displayed on device 50.

The user interface may be generated by wallet user interface 410 or a trusted third party application 200 supported by OpenWallet 100. As an example, FIGS. 4A and 4B, illustrate the provisioning of a "Charge-It Card" into the wallet using one exemplary wallet user interface 410 that may be deployed on a smart phone. Underlying either user interface, the card services module 420 preferably transmits the first six digits of the identified credit card (commonly referred to as the Bank Identification Number or BIN) to the secure element management server, which then validates the card issuer's compliance rules and facilitates a direct key exchange between the OpenWallet 100 (or Card Services Module 420) on the user's mobile device 50 and an appropriate credential issuer adapter server in an encrypted fashion as was previously known in the art.

Various approaches to the direct key exchange may be facilitated by a variety of off-the-shelf solutions provided by entities including, but not limited to, Gemalto N. V. (Amsterdam, The Netherlands), Giesecke & Devrient (Munich, Germany), SK C&C (Korea) (Corefire), or VIVOtech Inc. of Santa Clara, Calif. (ViVoTech credential issuer adapter server). The credential issuer adapter server authenticates the user, executes issuer rules and then initiates the personalization process. The credential issuer adapter server is preferably a server operated by the issuer of the credentials that the user is seeking to provision. The credential issuer adapter server may verify the user, for example by providing a series of verification questions based on user information previously provided to the issuer (see FIG. 4B). Once verified, the credential issuer adapter server passes the full 16 digit credit card number to the secure element 120 via the card services module 420. The credential issuer adapter server may also pass metadata, such as information relating to the look and design of the selected credit card to the application memory 125. On completion, the credential issuer adapter would notify the secure element management server about the completion of the transaction. As shown in FIG. 4C, following provisioning the wallet user interface 410 would include the Charge-It Card, which the user could select using user interface techniques that are well-known in the art of smart phone user interfaces.

Validating Third Party Applications

As noted above, OpenWallet 100 verifies the trusted status of any third party application 200 before that application is allowed access to the secure element 120 (or secure data store 115 and even preferably the meta data repository 125) on the portable communication device 50 to view, select and/or change secure data stored in the payment subsystem 150. In one approach noted above, this verification may be accomplished by accessing a local authorization database of permitted or trusted applications. In a preferred approach, the local authorization database in cooperates with a remote authorization database associated with one or more servers associated with system management back end 300.

Figure 6:
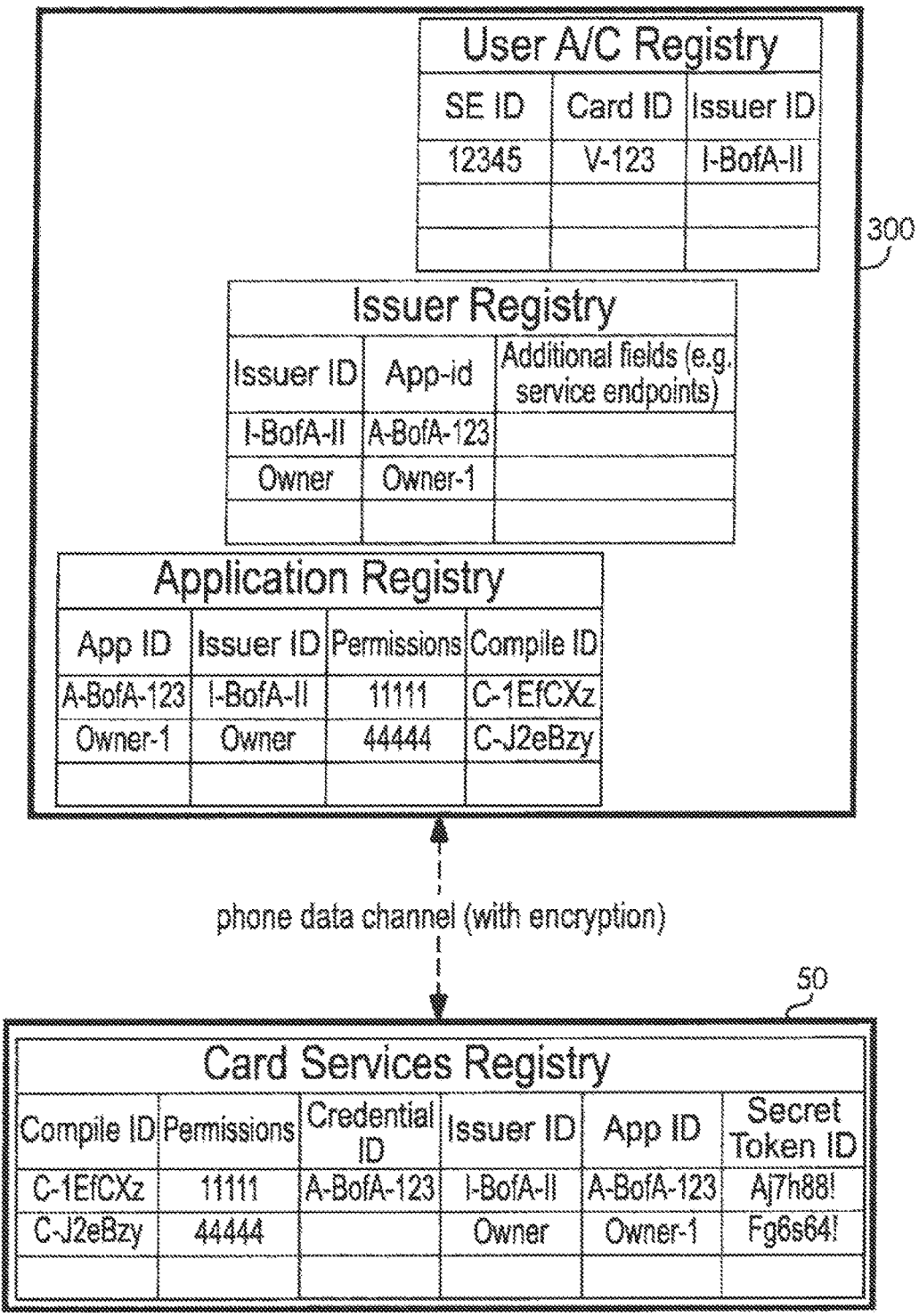
FIG. 6 is a block diagram of one potential implementation of a system underlying the grant of permission for one of the third party apps to view, select and/or change secure data stored in the payment subsystem.

FIG. 6 is a block diagram of one potential implementation of one potential combination of local and remote authorization databases to enhance security of the card services module 420, secure element 120, and payment subsystem 150. As shown in FIG. 6, a User A/C Registry (or User Account Registry) may be associated with the server (or otherwise deployed in the cloud). The User A/C Registry may store the identification of the secure element 120 disposed in each user's portable device 50. Entries in the User Account Registry may be added for each user at any point in the process.

The "Issuer Registry" database is a database of approved Issuers. The Issuer ID is unique for each type of credential. In other words, if a bank has multiple types of credentials (e.g., debit cards, credit cards, affinity cards, etc.) each credential type would have its own Issuer ID (e.g., I-BofA-II). In a preferred approach, the Issuer ID as between multiple types of credentials would have some common elements, so as to indicated that the credentials are at least related (e.g., I-BofA-I). In this way applications from same issuer can share data with the other application of the same "extended" issuer. In a preferred approach, card services module 420 can be simplified by requiring even the wallet user interface 410 (which "ships with the system") to have an Issuer TD (and as well as an Application ID and Compile token).

Figure 3:
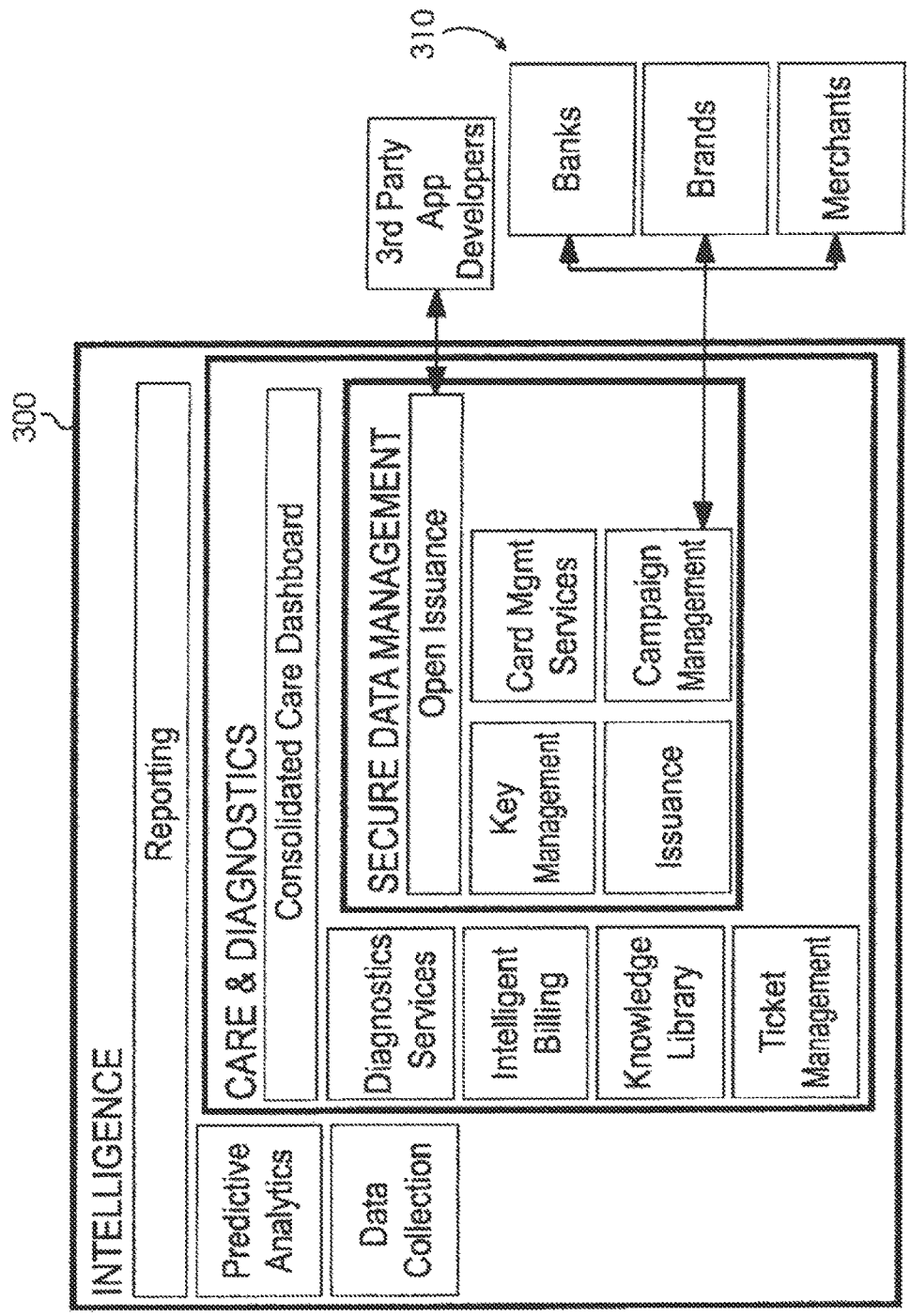
FIG. 3 is a block diagram illustrating the logical blocks within the system management back end.

The "Application Registry" is a database of applications (mostly third party) that have pre-approved by an operating system provider. Like the User A/C Registry, the "Application Registry" and "Issuer Registry" database are maintained on the server side (or otherwise in the cloud) in operable association with Open issuance (see FIG. 3). As would be understood by those of ordinary skill in the art having the present specification before them, the various registries may be implemented in separate databases or one unified database. At initiation of a wallet 100 and preferably at substantially regular time-intervals thereafter (e.g., daily), the data stored in the Application Registry of Open Issuance (see, FIG. 3) is distributed to devices with the wallet to be stored locally.

As shown in FIG. 6, the Application Registry may include, among other information, an Application ID ("App ID"), an Issuer ID, and a Compile ID or token. The Compile ID is a global constant generated for each application by one or more processes associated with Open Issuance (FIG. 3) during the qualification process for the particular application 200. After it is generated by a particular card services module 420 on a unique device 50, the Compile token is included or otherwise associated with the application. This Compile token is preferably generated by a pseudo-random number generator local to the device that uses a predetermined seed, such as the Application ID, Compile ID, Issuer ID or some combination thereof.

When the user seeks to qualify a third party application with the card services module 420 on a device 50, the Compile ID (a digital token) and Application ID (a digital identifier) associated with the third party application may be matched against the Compile ID and Application ID pairs stored in the Card Services Registry stored on the device 50 (see FIG. 6). As should be understood by those skilled in the art having the present specification before them, the same Compile and Application ID pairs are transmitted to (or in some instances pre-stored within) other devices 50 associated with the system, as well. If the Compile ID/Application ID pair matches one of the pair-stored in the Card Services Registry on the device, a Secret Token ID is preferably generated on the device 50 by a pseudo-random number generator (such as the one associated with the Secure Element 120 and then stored in association with the Compile ID/Application ID pair in the Card Services Registry on the device 50. In some instances, the Compile ID may be pre-selected and used to seed the random number generator. It should be understood that one or more pieces of other predetermined data associated with the card services registry could be preselected as the seed instead. The Card Services Registry is preferably stored in secure memory (rather than the secure element 120 because secure element 120 has limited real estate) and the Card Services Registry is preferably further encrypted using standard encryption techniques. The Secret Token ID is also embedded in or otherwise associated with the application 200 on the device 50 in place of the Compile ID that was distributed with the application.

After the third party application has been loaded into the Card Services Registry (and the secret token embedded in the application), the third party application may launch and may prompt the user to opt-in to provide access to the issuer-specific credential(s) needed for (or otherwise desired for use with) the now validated (or trusted) application. In each subsequent launch of the third party trusted application, the embedded Secret Token and/or Application ID are compared to the data in the Card Services Registry on the device. If there is match, the application is trusted and can access the payment subsystem 150 via card services module 420. In this manner, it can be seen that the Secret Token and/or Application ID associated with any of applications 200 or wallet user interface 410 may also be removed from the Card Services Registry and thus would be disabled from accessing the payment subsystem and possibly the application, altogether. Similarly, if any application 200 or wallet user interface 410 are tampered with the Secret Token and/or Application ID will be invalidated. The Issuer Registry, Card Services Registry, Application Registry, User A/C Registry, and the permissions table, such as the one described below, may be protected by encrypted the table using, for example, a security algorithm (e.g., advance encryption standard (AES) algorithm, the secure hash algorithm (SHA), message digest 5 (MD5) algorithm, and the like) with a key value that is a hash generated from one or more parameters (e.g., a secure element ID, passcode, etc.) as inputs. If a rogue application tampers with the Card Services Registry, for instance, the Card services module 420 would detect the change and replace the permission table with one retrieved from the secure element management server.

Card services module 420 also preferably uses the trusted application verification step to determine the appropriate level of subsystem access allowed for each application 200. For example, in one embodiment, one application 200*a* may be authorized to access and display all of the data contained in the payment subsystem 150, where another third party application 200*x* may be only authorized to access and display a subset of the data contained in the payment subsystem 150. In yet another embodiment, an application may be permitted only to send a payment or transaction requests to OpenWallet 100, but may not itself be permitted to access any of the data contained in the payment subsystem 150. In one approach, assignment of permissions to the application can be thought of as follows:

|  | Reserved | All Credentials | Extended Issuer Credentials | Own Credentials |
|---|---|---|---|---|
| Read | 0 | 0 or 1 | 0 or 1 | 0 or 1 |
| Write | 0 | 0 or 1 | 0 or 1 | 0 or 1 |
| Delete | 0 | 0 or 1 | 0 or 1 | 0 or 1 |
| Activate/Deactivate | 0 | 0 or 1 | 0 or 1 | 0 or 1 |
| Download Credential | 0 | 0 or 1 | 0 or 1 | 0 or 1 |

These permission can be used to form 4 hexadecimal number in the order shown above from most to least significant figure. As shown in the example Card Services Registry of FIG. 6, the 1-BofA-II issuer has permission level 11111, which can be thought to expand to 0001 0001 0001 0001 0001. In other words, the I-BofA-II application can read, write, delete, activate/deactivate, and download its own credentials but not the extended issuer credentials let alone all credentials. If BofA had another issuer code (e.g., I-BofA-1), then that would be an extended Issuer application. So, if the permission level of the application associated with Issuer ID "1-BofA-II" was set to 0010 0001 0001 0010 0001 (or 21121 hexadecimal) then the application would be able to read and activate/deactivate the credentials associated with both issuer IDs. In yet another example, the wallet user interface 410 may be given a permission level of 44444 (i.e., 0100 0100 0100 0100 0100). In other words, the wallet user interface 410 can read, write, delete, activate/deactivate, and download all credentials. As would be understood by those of ordinary skill in the art, these are merely examples of potential permissions that can be granted to applications, other permissions are contemplated. For instance, some applications may have the ability to read extended issuer credentials, but only write, delete, activate and download the application's own credentials (e.g., 21111, which expands to 0010 0001 0001 0001 0001). In yet another example, an application may only be given activate/deactivate and download tights (e.g., 0000 0000 0000 0001 0001 or 00011 in hexadecimal). In yet another example, an application may be disabled—without being deleted from the trusted application database or Card Service Registry—by setting all rights to zero.

Trust Provisioning

At certain intervals, trustworthiness of the CSM 420 may need to be confirmed. The CSM 420 may be, for example, a software program or other computer readable instructions stored on a non-transitory computer readable medium (e.g., memory, RAM, ROM, etc.). The instructions, when executed by at least one processor of device 50, may cause device 50 to perform the operations described herein. Trustworthiness may be confirmed, for example, when the CSM 420 is used by the portable device 50 for the first time, when software of the CSM 420 is updated, when a predetermined amount of time has elapsed since last confirming trustworthiness of the CSM 420, when a third party application 200x newly loaded on device 50 attempts to utilize data stored in the secure element 120, or each time a third party application attempts to utilize data stored in the secure element 120. Trust provisioning may also be used to prevent rogue CSMs or applications from obtaining access to sensitive information stored in the secure element 120. Below, rogue CSMs are discussed, however, the same security issues also apply to rogue applications. Rogue CSMs may be obtained from any number of places, including being downloaded from an online marketplace. Hackers may also design rogue CSMs that mimic the CSM 420. Example embodiments may prevent such attacks, as described in further detail below.

In accordance with example embodiments, CSM 420 and one or more third party applications may each undergo a registration process to establish their trustworthiness prior to utilizing data stored by secure element 120. Utilizing data may include one or more of reading data, deleting data, writing new data, or otherwise manipulating data stored by secure element 120 or otherwise associated with the secure transactional subsystem.

Figure 7A:
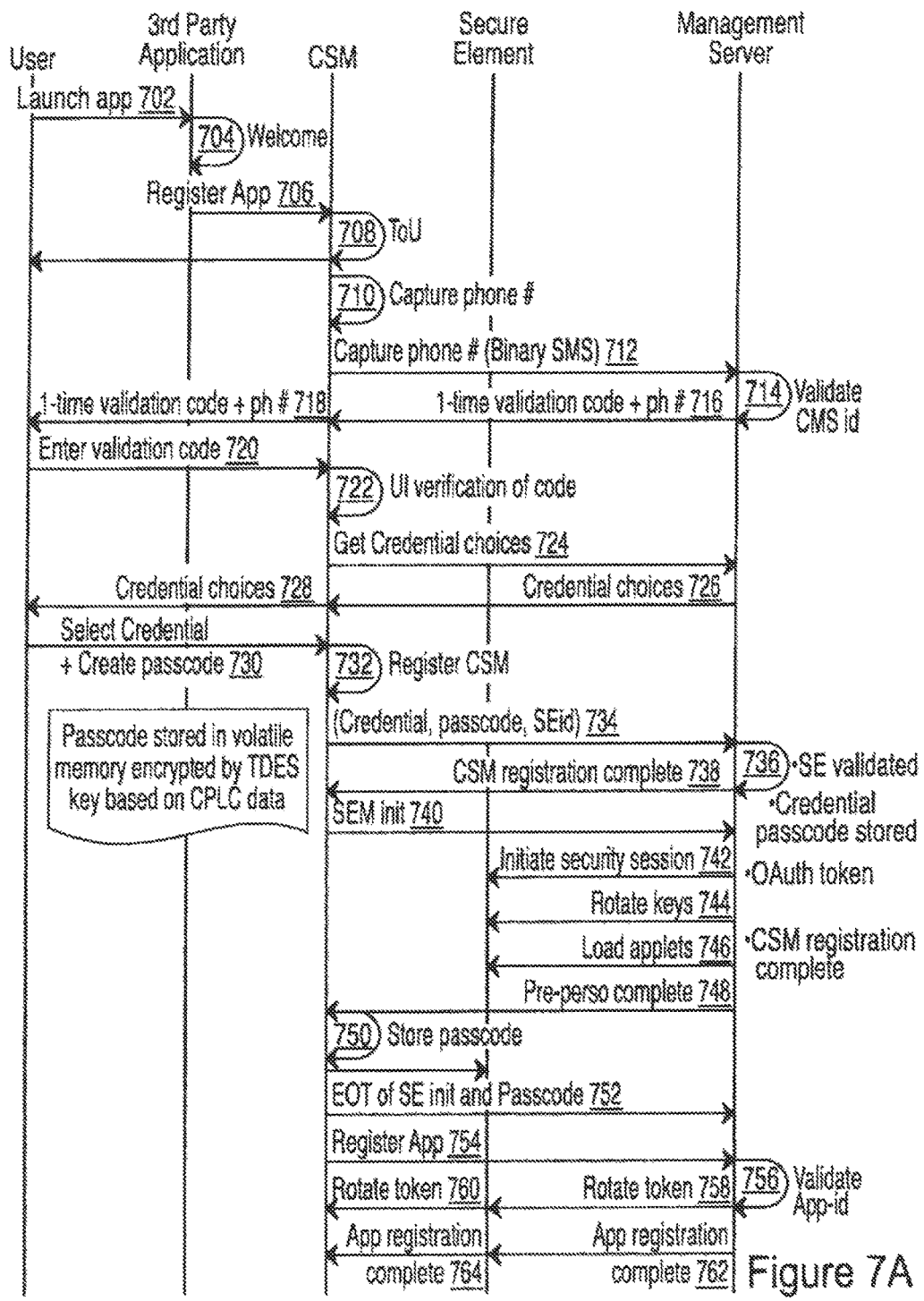
FIGS. 7A-C illustrate example communication flow for registering of a card services module (CSM) and a third party application in accordance with example embodiments.
Figure 7B:
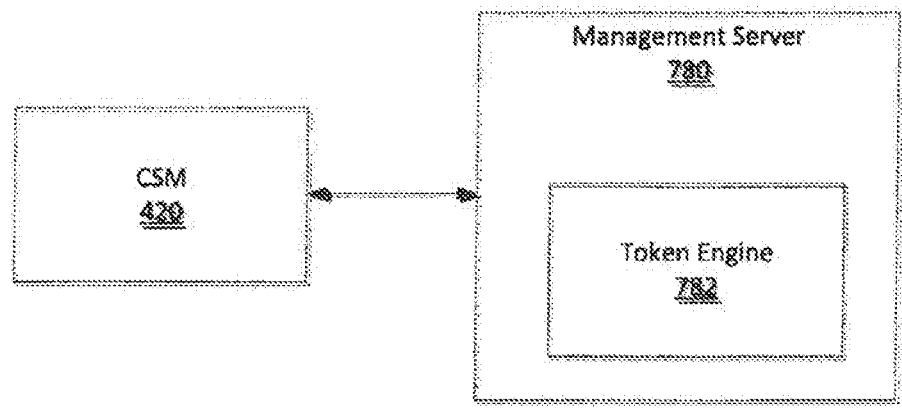
Figure 7C:
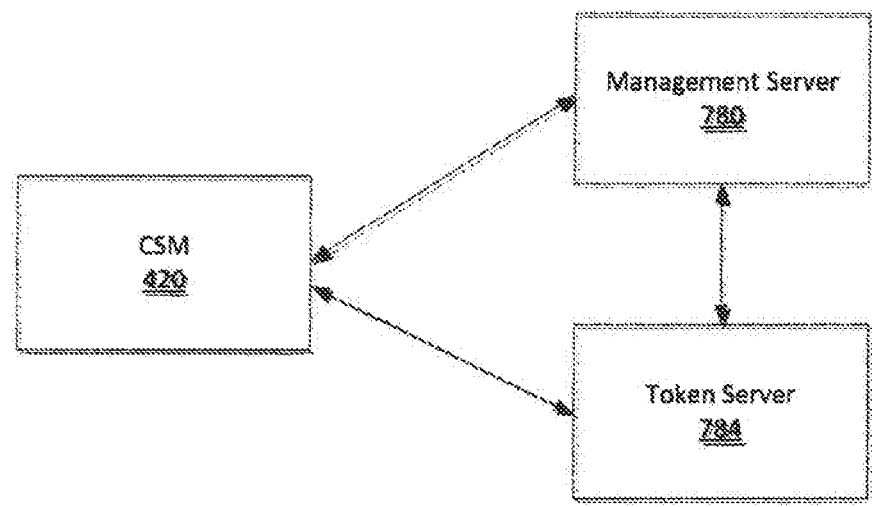

To establish trust, CSM 420 may attempt to register with a server of back end management system 300 ("management server 780, shown in FIGS. 7B-C). In an example, the management server 780 may include at least one processor and at least one memory (or non-transitory computer readable media) storing computer readable instructions. The instructions, when executed, may cause management server 780 to perform the functions described herein. If registration of the CSM 420 with the management server 780 is successful, CSM 420 may then attempt to register one or more third party applications via the management server 780. Once a third party application is successfully registered by CSM 420, the CSM may then permit then that third party application to utilize data associated with the secure transactional subsystem as described above.

Figure 8B:
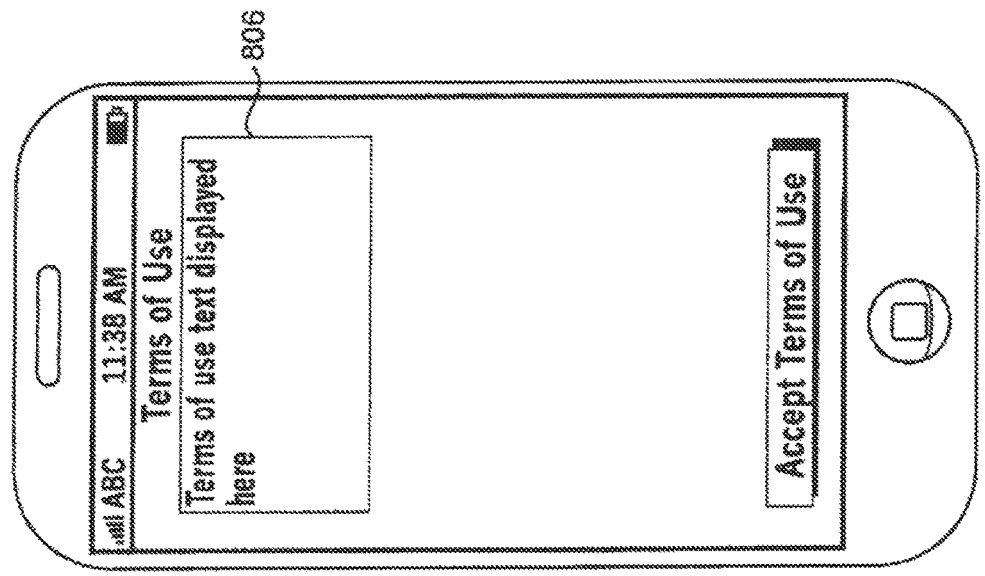
Figure 8A:
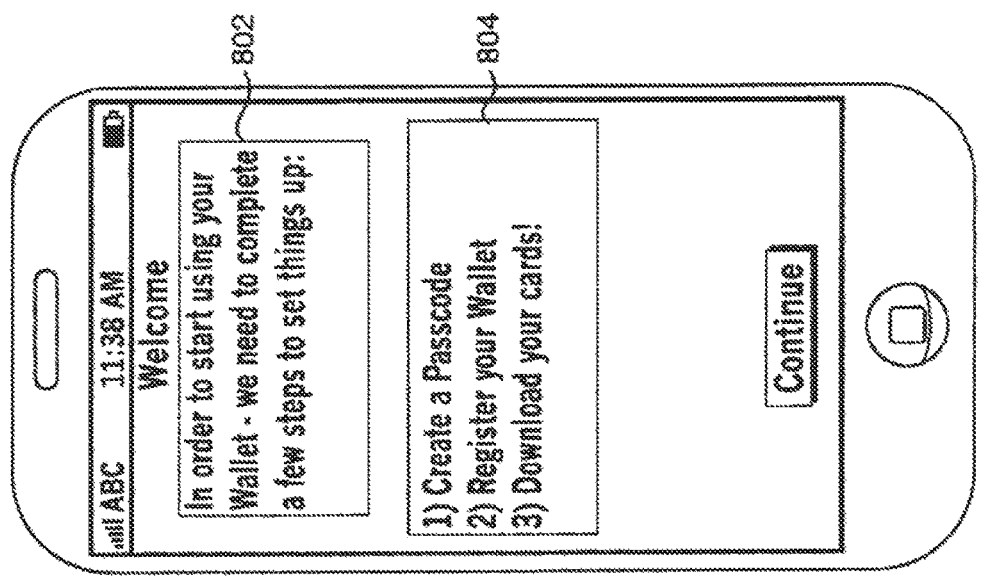

FIGS. 7A-C illustrate example communication flow for registration of CSM 420 and subsequent registration of one or more third party applications in accordance with example embodiments. In association with FIG. 7A, FIGS. 8A-I illustrate graphical user interfaces presented to a user by device 50 during and subsequent to registration. At element 702, a user may cause their portable communication device 50 to launch a third party application 200x. In some examples, the third party application may, at element 704, cause device 50 to present a welcome screen to the user. FIG. 8A illustrates an example welcome screen that may be presented during registration of a third party wallet application that includes a welcome message in field 802 and registration instructions in field 804. In other examples, CSM 420, instead of a third party application, may present the welcome screen. As would be understood by those skilled in the art having the present specification, drawings, and claims before them, the particular language presented in FIGS. 8A-J merely provide an example of the type of functions and/or language that may be used to accomplish the functionality intended for operation of the present invention.

At element 706, a third party application may initiate a registration process with CSM 420. For example, the third party application may communicate a utilization request to CSM 420 to initiate registration. (In this regard, the third party application need not be an application that seeks to use CSM services. In fact, this third party application may be a module of the operating system (or even firmware) of the portable communication device. It is also possible for the CSM to launch, itself, at some pre-determined event or time, to achieve initial. trust provisioning.) At element 708, CSM 420 may cause device 50 to present terms of use ("ToU") to the user for acceptance by the user of those terms. FIG. 8B illustrates an example graphical user interface presenting ToU for the third party application in field 806. If the ToU are manually accepted by the user, CSM 420 may continue with the registration process. An acceptance button is illustrated, however, as one of ordinary skill in the art having the present specification, drawings, and claims before them would understand, other methods for indicating acceptance that may or may not provide additional layers of security may be used.

At element 710, CSM 420 may capture a device identifier of device 50. In an example, device identifier may be a phone number, a media access control (MAC) address, or other information used to address device 50 (usually uniquely to the individual device, but potentially portable between single devices (e.g. telephone numbers, SIM cards, etc.). CSM 420 may prompt the user to manually input the device identifier, may query a known storage location of the device 50 for the device identifier, or may query management server 780 for the device identifier.

At element 712, CSM 420 may cause device 50 to communicate a CSM registration request message to management server 780. In an example, the CSM registration request message may be transmitted to the management server 780 via a binary short message service (SMS) message that includes the device identifier (e.g., phone number) and a CSM identifier, which may be a unique code or sequence that identifies the CSM 420, and perhaps even the particular instance of the CSM.

At element 714, the management server 780 may attempt to validate the CSM identifier. As an example, the CSM identifier may be a phone number of device 50, an initial Compile ID of CSM 420, an international mobile subscriber identity (IMSI), CPLC data, or an email address of a user. In another example, the CSM identifier may be a combination of two or more types of data. For example, an initial Compile ID of CSM 420 may be combined with a unique identifier of device 50, such as, but not limited to, CPLC data, a phone number, and the like. When using an email address as the CSM identifier, device 50 may, for example, perform ASCII conversion of characters in the email address to binary or hexadecimal numbers. The validation process may ensure that the CSM identifier input by the user, derived from data input by the user, or otherwise provided by device 50 matches the CSM identifier previously stored by management server 780 (e.g., confirm that input phone number matches phone number previously stored by server 780). If validated, the management server 780 may, at element 716, communicate a registration response message addressed to the device identifier. In an example, the registration response message including a validation code may be sent to the identified device as a binary SMS message (using the standard communication pathway for such messaging). Alternative communication pathways may be utilized to return the registration response message to the device 50. However, it is preferable to use a pathway separate from the pathway used by the CSM to normally communicate with server 300 to provide some additional security to the trust provisioning process. One or more of email, SMS, MMS and voice are examples of separate pathways for sending the registration response message to the user. The received message may also prompt the user to provide additional information to confirm their identity. The validation code may be a single use code having a predetermined time-to-live indicating the time during which the code is valid and may be implemented, for example, as a counter or timestamp.

Figure 8D:
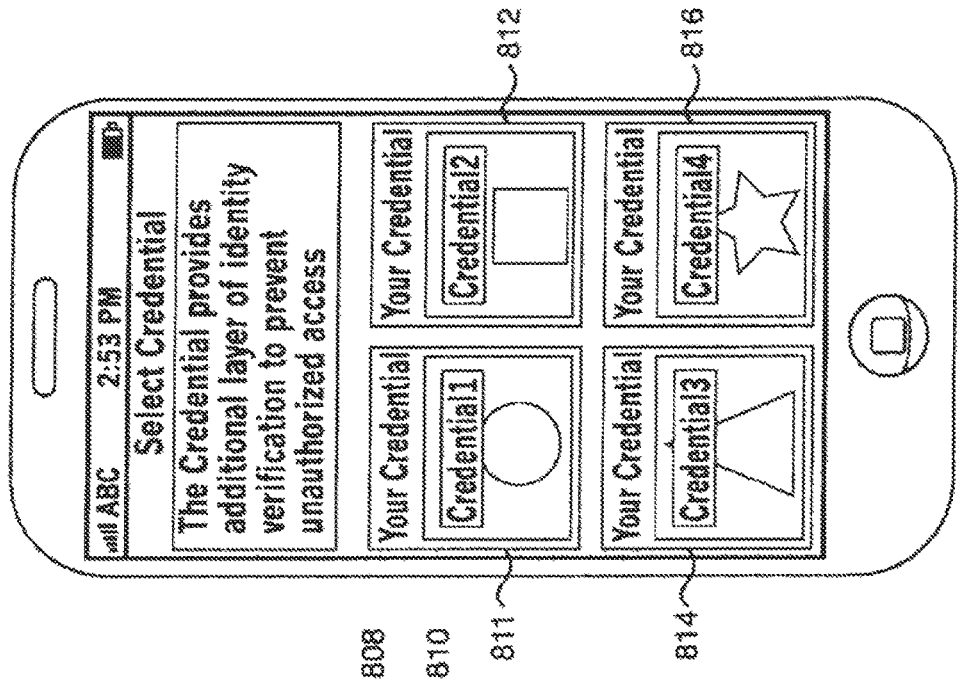
Figure 8C:
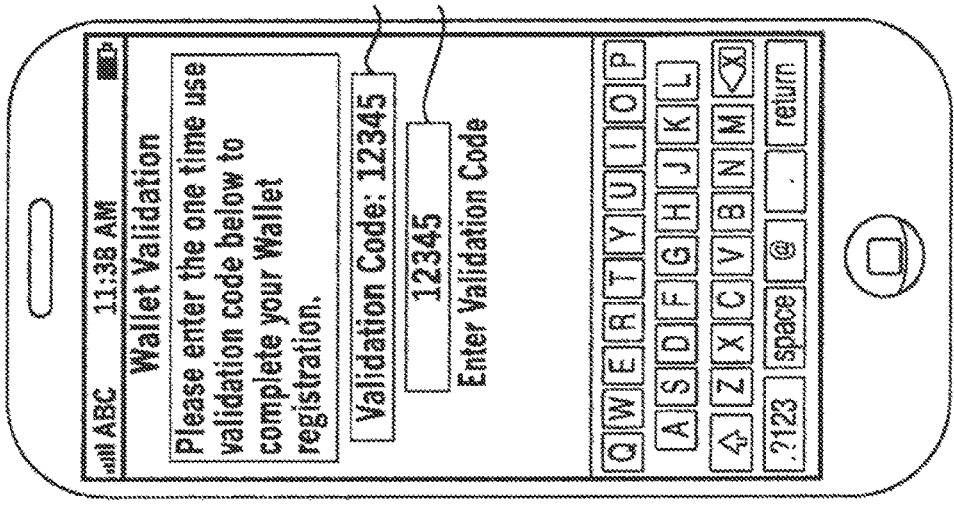

At element 718, CSM 420 preferably presents the received validation code to the user and, at element 720, prompts the user to manually input the validation code. As seen in FIG. 8C, a graphical user interface may include field 808 displaying the received validation code and field 810 into which a user manually inputs a validation code using, for example, a keypad of the p01table device 50. If the predetermined time-to-live set on the validation code expires before the user inputs the code, elements 710-716 may be repeated to obtain another validation code. (Otherwise, without a live validation code the initial trust provisioning will fail.) At element 722, CSM 420 may verify that the received validation code matches the manually input validation code. If successfully verified, CSM 420 may initiate a credentialing process to prompt the user for information for authenticating the user during subsequent attempts to use the third party application. This credentialing process may include standard Know Your Customer queries, however, other potential credentialing efforts may be used alternatively or in addition to these standard queries.

At element 724, CSM 420 may communicate a credential choices request to the management server 780. The management server 780 may, at element 726, reply with a credential choices response message including multiple visual credentials from which a user may select for use in user authentication. In other examples, the visual credentials may be stored locally by the secure element 120 and/or by the secure data store 115. The visual credential is intended to provide an additional layer of identity verification to prevent a user from unwittingly inputting sensitive information into a rogue CSM. Where a rogue CSM attempts to mimic CSM 420 (even providing a user interface that prompts the user to input authentication information), the rogue CSM would not be able to definitively determine what visual credential the user previously selected, and thus is unlikely to present to the user that user's particularly selected visual credential during CSM registration. The user, upon seeing that the CSM has not presented the correct visual credential, may recognize that the incorrect visual credential has been presented and then decide not to input authentication information into the user interface presented by the rogue CSM.

At element 728, CSM 420 may present the multiple visual credentials to the user for manual selection of a particular one. The user selection of a particular visual credential may be saved locally on the device 50 in secure data store 115 and may further be encoded. In another approach, the particularly selected credential may be saved locally on the device 50 in an encoded manner. As shown in FIG. 8D, a graphical user interface may, for example, present four different visual credential choices 811, 812, 814, and 816 permitting the user to select a desired one of the credentials. Of course as would be understood by those of ordinary skill in the art having the present specification before them, more than four visual credential choices may be provided to provide a higher barrier to randomly identifying the visual credential selected by a user. Another approach to adding variability may be provided by allowing the user to change some overall aspect of the visual credential (such as its color, orientation, frame, cropping of the image, etc.) and/or by associating a text string with the visual credential. As would be understood by those of ordinary skill in the art having the present specification, drawings, and claims before would understand that an audio component could be similarly added to the credential package to provide alternate or additional security. With any or all of this added variability the difficulty for a rogue CSM to correctly guess the visual credential selected by the user may be significantly increased, thus, further improving the security.

At element 730, a user may create a passcode (see FIGS. 8E-F). The passcode may be a number sequence, a code sequence, or other alphanumeric sequence created by the user. The passcode may be used to authenticate the user during subsequent attempts to use the third party application. As seen in FIG. 8E, a graphical user interface may prompt the user to input a passcode in field 818 and to repeat the entered passcode in field 820. The CSM 420 may confirm that the passcodes entered in fields 818 and 820 match. If the passcodes do not match, CSM 420 may prompt the user to reenter a passcode until a match is confirmed or some limit on the number attempts is reached.

At element 732, CSM 420 may register the user's selected visual credential and passcode as the credentials the user will provide for user authentication. To protect the passcode, CSM 420 may, for example, cause device 50 to store the passcode in the secure data store 115. In a preferred approach, the passcode may be stored in a volatile memory encrypted by a triple data encryption algorithm (TDES) key generated based on Card Production LifeCycle (CPLC) data. Other encryption algorithms and data input to such algorithms may also be used. CPLC data may be data that uniquely identifies and is preferably stored within secure element 120. CPLC data may include, for example, fabrication date, manufacturer, and a unique serial number of the secure element. In some examples, the composition and format of CPLC data may vary between manufacturers or between product types. The secure element 120 may protect the CPLC data using SHA, the MD5 algorithm, the AES algorithm, and the like. The volatile memory may erase the passcode should a thief tamper with the form factor of a stolen device 50 in an attempt to retrieve the passcode.

At element 734, CSM 420 may communicate to management server 780 a credential registration message including the selected visual credential, passcode, and secure element identifier of secure element 120. In some examples, CSM 420 may initiate a communication session between portable device 50 and the management server 780 using a secure communication protocol (e.g., hypertext transfer protocol secure (HTTPS)). It is noted that any communication described herein may be encrypted using a secure communication protocol.

At element 736, management server 780 may validate the secure element identifier, and store the selected visual credential and passcode in a registration table for subsequent authentication of the user. In an example, the registration table may be protected by the advanced encryption standard (AES) algorithm seeded with the secure element identifier (and/or other CPLC data) of secure element 120. The registration table may also store CPLC data as well as other information about the secure element 120. When a user subsequently attempts to use the third party application, device 50 may retrieve the selected visual credential for presentation to the user. Device 50 may communicate the selected visual credential and passcode for subsequent authentication of the user by the management server 780.

As part of validating the secure element identifier, management server 780 may generate a token based on, for example, the validation code and the secure element identifier. The token may have a predetermined time-to-live indicating the time during which the code is valid. After the predetermined time-to-live has expired, device 50 may request an additional token.

In some examples, the token may be an access token created or otherwise issued in accordance the OAuth 2.0 Authorization Framework specification, Internet Engineering Task Force (IETF), Request for Comments (RFC) 6749, October 2012, the content of which is incorporated herein by reference in its entirety. For instance, OAuth 2.0 may be used to authenticate endpoints (e.g., CSM 420 and back end management system 300), and to protect against, for example, various types of attacks (e.g., man-in-the-middle attacks, credentials-guessing attacks, phishing attacks, etc.). An applet or third party application may use the token to encrypt messages communicated to the management server.

The token may be generated in a two-legged or a three legged approach, depending on a desired level of security. The three-legged approach may be more secure due to the fact that CSM 420 communicates with separate servers to obtain a token, rather than communicating with a single server to obtain the token as in the two-legged approach. The three-legged approach may, for instance, make it more difficult to execute a man-in-the-middle attack.

FIG. 7B illustrates an example of a 2-legged approach for generating a token in accordance with example embodiments. As depicted, management server 780 may include a Token Engine 782 which may be hardware, software, or a combination thereof that generates the token (e.g., an OAuth token). Management server 780 may use the token engine 782 to generate and communicate, via a network or direct link, a new token to the CSM 420. Management server 780 may also use the token engine 782 to authenticate a previously generated token received from CSM 420. In some examples, the token will preferably have a predetermined time to live indicating the time during which the code is valid. After the predetermined time to live, device 50 may request an additional token.

A three-legged approach may also be used to generate the token. FIG. 7C illustrate an example of a 3-legged approach for generating a token in accordance with example embodiments. As depicted, management server 782, token server 784, and CSM 420 may be communicatively coupled via a link or network. Token server 784 may include the functionality of the Token Engine 782, described above, and may be logically and/or physically separated from management server 780. For example, management server 782 may be separate hardware and may be located at a different location than the token server 784. The different location may be a different physical location and/or a different network location. For example, management server 780 may be located in Foster City, Calif., and token server 784 may be located in San Francisco, Calif. In another example, management server 780 and token server 784 may be located in a common geographic location, but may have unique network addresses (e.g., unique IP addresses).

To request a token in the three-legged approach, the CSM 402 may communicate a credential registration message to management server 780, which may respond to the CSM 420 with a network address (e.g., a link, a uniform resource locator, etc.) of the token server 784. CSM 420 may forward the credential registration message to the token server 784, which may attempt to authenticate the CSM 420 based on the credential registration message. If successful, token server 784 may generate and communicate a token to the CSM 420.

Regardless of which approach is used to generate the token, CSM 420 may include the token in subsequent communications to management server 780 for authentication purposes. In the two-legged approach, management server 780 may instruct the token engine 782 to process the token to authenticate a message received from the CSM 420. In the three-legged approach, management server 780 may forward the token to token server 784 for authenticating the token. Token server 784 may reply to management server 780 indicating whether the token is currently valid.

Referring again to FIG. 7A, successful creation of the token may complete registration of CSM 420, and management server 780 may, at element 738, send a CSM registration message complete to CSM 420 acknowledging that registration was successful. If unsuccessful, the CSM registration message may be an acknowledgement message indicating that registration was not successful. CSM 420 may attempt to register by repeating the preceding elements at least a predetermined number of additional of times. At element 740, CSM 420 may initialize the secure element 120. The initialization stage may comprise the CSM 420 communicating an initialize message to the management server 780. At element 742, management server 780 may communicate an initialize security session message to secure element 120 via the CSM 420. In one example, the security session may be in accordance with Global Platform technical specifications (e.g., 2.1.X, 2.2, 2.2.X, etc.).

As would be understood by those of skill in the art, the secure element 120 contains at least one encryption key stored when manufactured and that is also known to the management server 780. The encryption key may be based on the CPLC data of the secure element 120 and hence may be unique to the secure element 120. Management server 780 may encrypt the initialize security session message with the encryption key, and the secure element 120 may use the encryption key to decrypt the initialize security session message. At element 744, the management server 780 may instruct secure element 120 via CSM 420 to rotate one or more encryption keys. Rotation may refer to the process of changing an encryption key used by the secure element 120 to encrypt data (e.g., for encrypting communications sent to management server 780 and/or to point-of-sale or access devices via an RF or NFC baseband). In an example, secure element 120 may generate a new encryption key that is a function of the secure element ID, the CPLC data, and data provided by the management server 780 in the initialize security session message. For instance, secure element 120 may combine the secure element ID, CPLC data, and the received data to form a seed for a random number generator. Seeds may also be a function of one or more of the Application ID of the CSM 420, the Compile ID of the CSM 420, the phone number associated with the device 50, the MAC address (or some other unique code) associated with the particular device 50, time of day information, a polynomial, and the like, instead of or in addition to the secure element ID.

Secure element 120 may store the output generated by the random number generator using the seed, as a new encryption key. Where the secure element 120 has multiple encryption keys different seeds may be used to generate each key. Alternatively, the same seed may be used with different pseudo-random number generators. It would also be possible to use the results of one or more of the previously completed pseudo random calculations as the seed for a subsequent pseudo random number generation.

By rotating the keys, management server 780 via the CSM 420 manages the one or more encryption keys used by each secure element 120. However, advantageously, by using and storing the encryption key(s) in secure element 120, even if device 50 were rooted (i.e. hijacked at one or more of the device or operating system layers), the encryption key(s) used to encrypt data remains protected within secure element 120. Alternatively, it is contemplated that one or more of the encryption keys could be stored outside of the secure element 120 elsewhere within secure data store 115 with the understanding that the other areas of the secure data store may provide slightly less security than that provided by the secure element 120.

Further, each generated encryption key may have a set time-to-live and be associated with an inactivity timer (e.g., a watchdog timer). The inactivity timer may be a specified period of time and may be reset each time the user performs an operation requiring use of the encryption key (e.g., a management function, as described in further detail below). The duration of the set time-to-live and the inactivity timer may be based on business rules. Within the set time to live and to avoid excessive key rotation, CSM 420 may use the same encryption key as long as the inactivity does not expire. If either the set time-to-live expires or the inactivity timer expires, CSM 420 may request rotation of their encryption key. In some instances, CSM 420 may restrict a user from performing any transaction prior to key rotation, with the exceptions permitted by business rules.

Key rotation is intended to increase protection against a rogue CSM with a pseudo encryption key from performing transactions not approved by the user. The pseudo encryption key may differ from the encryption key generated by the random number generator because they were not created using the same process (e.g., rogue CSM would not know the CPLC data of the secure element 12). Advantageously, the rogue CSM will be unable to encrypt data in the same manner as the secure element 120, and hence management server 780 will not approve transactions requested by the rogue CSM.

Returning to FIG. 7, at element 746, the management server 780 may load one or more applets onto the secure element 120 via CSM 420. Among other programs, these applets are may include card emulation and other programs that manage a secure element. At element 748, the management server 780 may communicate a pre-personalization complete message to CSM 420. At element 750, CSM 420 may store the passcode input by the user in secure element 120 and may delete the passcode from the secure data store 115. Storage of the passcode in the secure element 120 may be in accordance with the manner in which passwords are managed by the password management system described in U.S. patent Ser. No. 13/447,489, filed Apr. 16, 2012, and titled "System and Method for Controlling Access to a Third-Party Application with Passwords Stored in a Secure Element," the content of which is incorporated herein by reference in its entirety. CSM 420 may present a graphical user interface informing the user that the passcode has been saved (see FIG. 8G).

At element 752, CSM 420 may perform an end of transaction (EOT) of secure element initialization and store the passcode therein. CSM 420 may notify all patties in the system that the transaction is complete so that all parties can save the information for audit, reporting, and tracking purposes. At element 754, CSM 420 may communicate, to management server 780, an application registration message including an identifier of the third party application to be registered. At element 756, management server 780 may attempt to validate the third party application using its Application TD and other information as described above with reference to FIG. 6.

At various times (illustrated by element 758 of FIG. 7A), management server 780 may instruct secure element 120 to rotate one or more of its token(s). As discussed above, securere element 120 may receive a token during registration and the applet/third party application may use the token to encrypt messages communicated to the management server 780. The management server 780 may rotate a token by communicating a new token to the CSM 420 for use by the applet and/or third patty application. In some examples, a hash of the rotated token may be stored as opposed to storing clear text of the rotated token. The rotated token may have a time-to-live value (e.g., 35 seconds, 1 minute, 1 day, etc.). Additionally, the rotated token may be replaced at certain times (e.g., every time a user performs a secure element management function). For example, a user may be prompted to input a passcode when performing certain secure element management functions including (a) adding a card, (b) deleting a card, (c) changing a passcode, (d) erasing a wallet, and (e) managing a card. In some instances, managing a passcode may not involve receiving a new token. At element 760, secure element 120 may inform the CSM 420 that the token has been rotated.

Figure 8H:
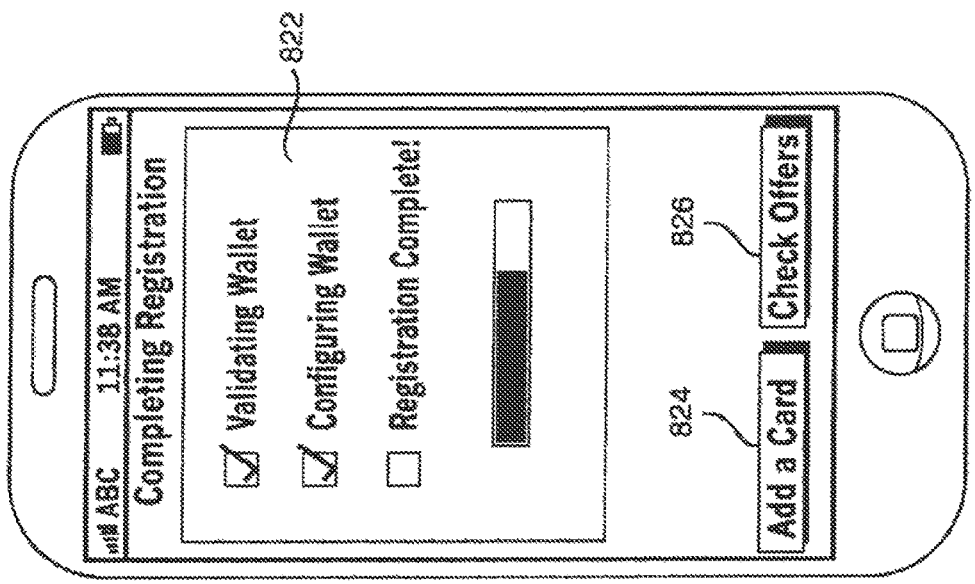
Figure 8G:
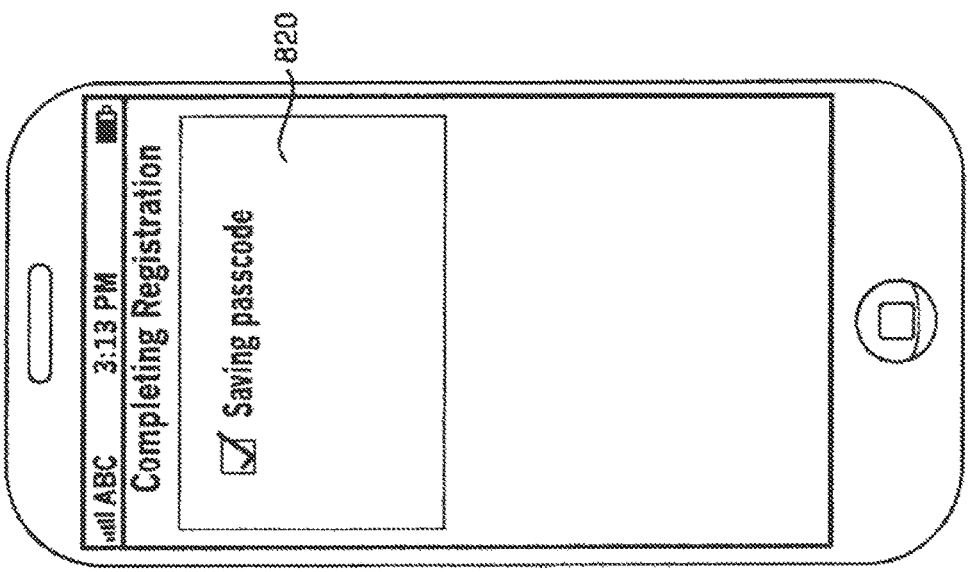

At element 762, the management server 780 may inform secure element 120 that registration of the third party application is complete. FIG. 8H illustrates an example graphical user interface to inform a user as certain steps of the registration process complete.

At element 764, secure element 120 may inform CSM 420 that registration of the third party application is complete. As seen in FIG. 8H, a graphical user interface may provide updates to the user in field 822 as a third party wallet application is validated and configured, and that registration of the wallet application is complete. Once registration is complete, a user may select field 824 to add a card or field 826 to check for offers. A card added may be, for example, a credit card, a charge card, or the like. Offers may include offers for products, services, or the like.

Figure 8I:
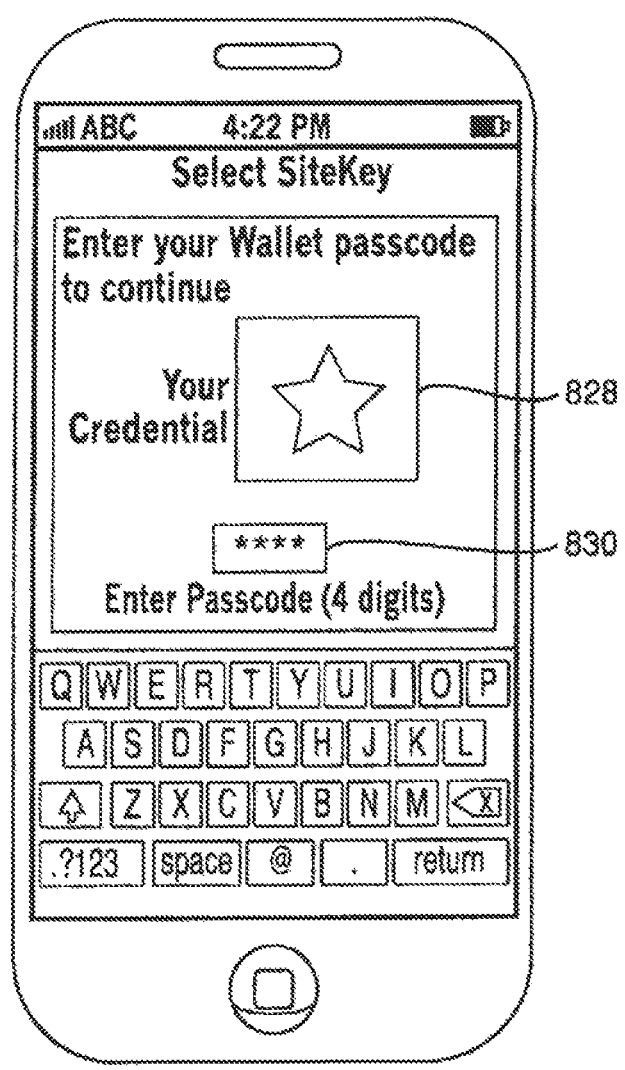

In subsequent attempts to use the third party application after registration, the CSM 420 may retrieve the credential, selected by the user during the registration process, from the management server 780 and may prompt the user to input their passcode. As seen in FIG. 8I, a graphical user interface may display the retrieved credential in field 828 and prompt the user to input their passcode in field 830. If the user determines that the displayed credential does not match the one selected by the user during registration, this may indicate to the user that the integrity of the CSM 420 may have been compromised. The user may then elect not to provide their passcode. If the displayed credential matches the one selected by the user during registration, the user may input the passcode created during registration. The CSM 420 may then proceed to register the third party application, as described above with reference to elements 752-764. The third party application may then use the token to communicate with the management server 780 to perform transactions. CSM 420 may also have to undergo the registration process above depending, for example, on the last time CSM 420 completed registration. In some examples, a user may create a unique credential/passcode pair for validating each third party application. In other examples, a user may create a credential/passcode pair that can be used to validate two or more third party applications, including up to all third party applications.

Advantageously, the example embodiments may avoid systemic risk should an encryption key of CSM 420 be compromised. While no amount of security is insurmountable, the examples described above provide security at least at individual devices 50, the secure element 120, the CSM 420, and the management server 780. Should an encryption key be compromised, the risk may be contained to a single device 50 because the encryption key is generated based on the CPLC data unique to its associated secure element 120*m*. Put in another manner, a rogue CSM 420 cannot use a compromised encryption key with any other secure element 120*n* because the CPLC data for that other secure element 120*n* will be different by definition (and design) than the CPLC data for secure element 120*m*. Yet, in each instance the CPLC data for both secure el elements 120*m* and 120*n* is stored in management server 780. Thus, the encryption key can only be used by the associated secure element 120, and no others. This one to one correspondence between an encryption key and secure element 120 advantageously avoids systemic risk should an encryption key be compromised.

The foregoing description and drawings merely explain and illustrate the invention and the invention is not limited thereto. While the specification is described in relation to certain implementation or embodiments, many details are set forth for the purpose of illustration. Thus, the foregoing merely illustrates the principles of the invention. For example, the invention may have other specific forms without departing from its spirit or essential characteristic. The described arrangements are illustrative and not restrictive. To those skilled in the art, the invention is susceptible to additional implementations or embodiments and certain of these details described in this application may be varied considerably without departing from the basic principles of the invention. It will thus be appreciated that those skilled in the art will be able to devise various arrangements which, although not explicitly described or shown herein, embody the principles of the invention and, thus, within its scope and spirit.

What is claimed is:

1. A method comprising:
receiving from a device, at a server, a registration request message to register with the server a first software application as implemented on the device;
validating at the server the registration request message;
sending, in response to a successful validating, a validation code from the server to the device;
subsequent to successful verification of the validation code by the device, receiving from the device, at the server, a passcode and an identifier of a secure element associated with the device;
in response to receiving the passcode and the secure element identifier, the server registering the first software application;
following registration of the first software application by the server, generating a token by another device associated with the server, wherein the token is derived from the validation code sent by the server; and
sending the token to the first software application on the device, wherein the token is used in securing communications between the first software application on the device and the server.

2. The method of claim 1, wherein the registration request message comprises an identifier of the device.

3. The method of claim 1, wherein the registration request message is a binary short message service message.

4. The method of claim 1, wherein the validation code is only valid for a predetermined amount of time.

5. The method of claim 1, further comprising receiving from the device, at the server, selection of a particular credential from a plurality of credential choices.

6. The method of claim 5, wherein each of the plurality of credential choices includes an image.

7. The method of claim 1, wherein the first software application is a third party software application that works with data stored by the secure element.

8. The method of claim 7, further comprising receiving an identifier of the third party software application at the server for validating the third party software application.

9. The method of claim 8, wherein the first software application is configured to at least one of request access to data stored by the secure element, modify data stored on the secure element, and write data to storage of the secure element.

10. A system comprising:
a server including a server processor and a server non-transitory digital storage element coupled to the server processor and storing logic that when executed by the server processor causes the server processor to:
receive from a device a registration request message to register with the server a first software application as implemented on the device;
validate the registration request message;
send, in response to validation, a validation code to the device;

receive, subsequent to validation, from the device, a passcode and an identifier of a secure element associated with the device;

register the first software application based on the passcode and the secure element identifier;

a token server, the token server being operably associated with the server, the token server including a token server processor and a token server non-transitory digital storage element coupled to the token server processor and storing logic that when executed by the token server processor causes the token server processor to:

generate a token following registration of the first software application wherein the token is derived from the validation code; and send the token to the first software application on the device, wherein the token is used in securing communication between the first software application on the device and the server.

11. The system according to claim 10 wherein the registration request message comprises an identifier of the device.

12. The system of claim 10 wherein the registration request message is a binary short message service message.

13. The system of claim 10 wherein the validation code is only valid for a predetermined amount of time.

14. The system of claim 10 wherein the logic executed by the server processor further causes the server processor to receive from the device selection of a particular credential from a plurality of credential choices.

15. The system of claim 14 wherein each of the plurality of credential choices includes an image.

16. The system of claim 10 wherein the first software application is a third party software application requesting to utilize data stored by the secure element.

17. The system of claim 16 further comprising receiving an identifier of the third party software application for validating the third party software application.

18. The system of claim 17, wherein the first software application is configured to at least one of request access to data stored by the secure element, modify data stored on the secure element, and write data to storage of the secure element.

* * * * *